(12) United States Patent
Chen et al.

(10) Patent No.: US 11,099,358 B2
(45) Date of Patent: Aug. 24, 2021

(54) PHOTOGRAPHING LENS ASSEMBLY, IMAGE CAPTURING UNIT AND ELECTRONIC DEVICE

(71) Applicant: LARGAN PRECISION CO., LTD., Taichung (TW)

(72) Inventors: Chun-Yen Chen, Taichung (TW); Cheng-Chen Lin, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 204 days.

(21) Appl. No.: 16/046,483

(22) Filed: Jul. 26, 2018

(65) Prior Publication Data
US 2019/0227278 A1    Jul. 25, 2019

(30) Foreign Application Priority Data

Jan. 24, 2018   (TW) .................. 107102474

(51) Int. Cl.
  *G02B 13/00*   (2006.01)
  *G02B 13/04*   (2006.01)
  *G02B 9/62*    (2006.01)
  *H04N 5/232*   (2006.01)

(52) U.S. Cl.
  CPC .......... *G02B 13/0045* (2013.01); *G02B 9/62* (2013.01); *G02B 13/04* (2013.01); *H04N 5/232121* (2018.08)

(58) Field of Classification Search
  CPC ........ G02B 13/04; G02B 13/06; G02B 13/18; G02B 9/34; G02B 9/12
  See application file for complete search history.

(56) References Cited

U.S. PATENT DOCUMENTS

| | | | |
|---|---|---|---|
| 5,691,850 A | 11/1997 | Arisaka | |
| 9,927,597 B2* | 3/2018 | Lee | G02B 13/0045 |
| 2015/0124333 A1 | 5/2015 | Noda et al. | |
| 2015/0338614 A1 | 11/2015 | Tang et al. | |
| 2015/0362702 A1 | 12/2015 | Tang et al. | |
| 2016/0124184 A1 | 5/2016 | Tang et al. | |
| 2016/0124185 A1 | 5/2016 | Tang et al. | |
| 2016/0124186 A1 | 5/2016 | Tang et al. | |
| 2016/0131872 A1 | 5/2016 | Tang et al. | |
| 2016/0131873 A1 | 5/2016 | Tang et al. | |
| 2016/0139367 A1 | 5/2016 | Jung | |

(Continued)

FOREIGN PATENT DOCUMENTS

| | | |
|---|---|---|
| CN | 105759406 A | 7/2016 |
| CN | 107065126 A | 8/2017 |

(Continued)

*Primary Examiner* — Joseph P Martinez
*Assistant Examiner* — Vipin Patel
(74) *Attorney, Agent, or Firm* — Maschoff Brennan

(57) ABSTRACT

A photographing lens assembly includes six lens elements which are, in order from an object side to an image side: a first lens element, a second lens element, a third lens element, a fourth lens element, a fifth lens element and a sixth lens element. The second lens element has positive refractive power. The third lens element has an image-side surface being concave in a paraxial region thereof. The sixth lens element has an image-side surface being concave in a paraxial region thereof, and the image-side surface of the sixth lens element has at least one inflection point.

14 Claims, 25 Drawing Sheets

(56) References Cited

U.S. PATENT DOCUMENTS

| | | |
|---|---|---|
| 2016/0356989 A1 | 12/2016 | Kubota et al. |
| 2017/0184817 A1 | 6/2017 | Lee |
| 2017/0336604 A1* | 11/2017 | Hsu .......................... G02B 9/62 |
| 2018/0348480 A1 | 12/2018 | Sekine |
| 2019/0204539 A1 | 7/2019 | Fang et al. |

FOREIGN PATENT DOCUMENTS

| | | |
|---|---|---|
| CN | 107966786 A | 4/2018 |
| CN | 108008519 A | 5/2018 |
| CN | 108152924 A | 6/2018 |
| CN | 108227138 A | 6/2018 |
| CN | 108227139 A | 6/2018 |
| CN | 207586515 U | 7/2018 |
| JP | 2014-010399 A | 1/2014 |
| JP | 2014-010400 A | 1/2014 |
| JP | 2014-010401 A | 1/2014 |
| JP | 2018-072716 A | 5/2018 |
| TW | I588526 A | 8/2017 |
| TW | I580999 A | 12/2017 |

\* cited by examiner

PHOTOGRAPHING LENS ASSEMBLY, IMAGE CAPTURING UNIT AND ELECTRONIC DEVICE

RELATED APPLICATIONS

This application claims priority to Taiwan Application 107102474, filed on Jan. 24, 2018, which is incorporated by reference herein in its entirety.

BACKGROUND

Technical Field

The present disclosure relates to a photographing lens assembly, an image capturing unit and an electronic device, more particularly to a photographing lens assembly and an image capturing unit applicable to an electronic device.

Description of Related Art

With the development of semiconductor manufacturing technology, the performance of image sensors has been improved, and the pixel size thereof has been scaled down. Therefore, featuring high image quality is one of the indispensable features of an optical system nowadays. Furthermore, due to the rapid changes in technology, electronic devices equipped with optical systems are developed towards multi-functionality for various applications, and therefore the functionality requirements for the optical systems have been increasing. However, it is difficult for a conventional optical system to obtain a balance among the requirements such as high image quality, low sensitivity, desirable size of the aperture, miniaturization or required field of view. Accordingly, the present disclosure provides an optical system satisfying the aforementioned requirements.

SUMMARY

According to one aspect of the present disclosure, a photographing lens assembly includes six lens elements. The six lens elements are, in order from an object side to an image side, a first lens element, a second lens element, a third lens element, a fourth lens element, a fifth lens element and a sixth lens element. The second lens element has positive refractive power. The third lens element has an image-side surface being concave in a paraxial region thereof. The sixth lens element has an image-side surface being concave in a paraxial region thereof, and the image-side surface of the sixth lens element has at least one inflection point. The photographing lens assembly further includes an aperture stop. When a focal length of the photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, an axial distance between the aperture stop and the image-side surface of the sixth lens element is SD, an axial distance between an object-side surface of the first lens element and the image-side surface of the sixth lens element is TD, a curvature radius of an image-side surface of the fifth lens element is R10, an axial distance between the object-side surface of the first lens element and an image surface is TL, a central thickness of the first lens element is CT1, and an axial distance between the first lens element and the second lens element is T12, the following conditions are satisfied:

$(|f/f1|+|f/f3|+|f/f5|)/(|f/f2|+|f/f4|+|f/f6|)<1.0;$ $0.72<SD/TD<1.0;$ $-0.90<f/R10<9.0;$ $1.75<TL/f<3.0;$ and $0.10<CT1/T12<3.3.$ According to another aspect of the present disclosure, an image capturing unit includes the aforementioned photographing lens assembly and an image sensor, wherein the image sensor is disposed on the image surface of the photographing lens assembly.

According to still another aspect of the present disclosure, an electronic device includes the aforementioned image capturing unit.

According to yet another aspect of the present disclosure, a photographing lens assembly includes six lens elements. The six lens elements are, in order from an object side to an image side, a first lens element, a second lens element, a third lens element, a fourth lens element, a fifth lens element and a sixth lens element. The second lens element has positive refractive power. The third lens element has an image-side surface being concave in a paraxial region thereof. The sixth lens element has an image-side surface being concave in a paraxial region thereof, and the image-side surface of the sixth lens element has at least one inflection point. The photographing lens assembly further includes an aperture stop. When a focal length of the photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, an axial distance between the aperture stop and the image-side surface of the sixth lens element is SD, an axial distance between an object-side surface of the first lens element and the image-side surface of the sixth lens element is TD, a curvature radius of an image-side surface of the fifth lens element is R10, an Abbe number of the sixth lens element is V6, and a refractive index of the sixth lens element is N6, the following conditions are satisfied:

$(|f/f1|+|f/f3|+|f/f5|)/(|f/f2|+|f/f4|+|f/f6|)<1.0;$ $0.72<SD/TD<0.95;$ $-0.90<f/R10<9.0;$ $7.0<V6/N6<33.0;$ and $|f4/f5|<2.0.$ According to yet still another aspect of the present disclosure, a photographing lens assembly includes six lens elements. The six lens elements are, in order from an object side to an image side, a first lens element, a second lens element, a third lens element, a fourth lens element, a fifth lens element and a sixth lens element. The second lens element with positive refractive power has an image-side surface being convex in a paraxial region thereof. The fourth lens element has positive refractive power. The sixth lens element has an image-side surface being concave in a paraxial region thereof, and the image-side surface of the sixth lens element has at least one inflection point. When a focal length of the photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, an axial distance between an object-side surface of the first lens element and an image surface is TL, a curvature radius of an object-side surface of the second lens element is R3, a curvature radius of the image-side surface of the second lens element is R4, a curvature radius of an object-side surface of the sixth lens element is R11, and a curvature radius of the image-side surface of the sixth lens element is R12, the following conditions are satisfied:

$$(|f/f1|+|f/f3|+|f/f5|)/(|f/f2|+|f/f4|+|f/f6|)<0.45;$$

$$1.70<TL/f<5.0;$$

$$-3.50<(R11+R12)/(R11-R12)<2.50;\text{ and}$$

$$0<(R3+R4)/(R3-R4)<3.50.$$

BRIEF DESCRIPTION OF THE DRAWINGS

The disclosure can be better understood by reading the following detailed description of the embodiments, with reference made to the accompanying drawings as follows.

DETAILED DESCRIPTION

A photographing lens assembly includes six lens elements. The six lens elements are, in order from an object side to an image side, a first lens element, a second lens element, a third lens element, a fourth lens element, a fifth lens element and a sixth lens element.

The first lens element can have negative refractive power. Therefore, it is favorable for providing a retro-focus lens configuration so as to gather light with a large angle of view, thereby capturing more image data.

The second lens element has positive refractive power; therefore, it is favorable for providing the main light converging power so as to reduce the total track length of the photographing lens assembly, thereby achieving compactness. The second lens element can have an image-side surface being convex in a paraxial region thereof; therefore, it is favorable for strengthening the refractive power of the second lens element and improving image quality with a larger angle of view.

The third lens element can have an image-side surface being concave in a paraxial region thereof; therefore, it is favorable for correcting chromatic aberration in the axial direction of the third lens element so as to provide images with true colors. The third lens element can have an object-side surface being convex in a paraxial region thereof; therefore, it is favorable for light converging in both tangential direction and sagittal direction so as to correct astigmatism. The third lens element can have negative refractive power; therefore, it is favorable for correcting chromatic aberration so as to prevent image overlapping caused by light rays with different wavelengths focusing on different positions.

The fourth lens element can have positive refractive power; therefore, it is favorable for providing light converging power on the image side of the photographing lens assembly so as to correct aberrations. The fourth lens element can have an image-side surface being convex in a paraxial region thereof; therefore, it is favorable for strengthening the light converging power of the fourth lens element so as to balance the refractive power distribution on the image side and reduce the back focal length of the photographing lens assembly.

Figure 25:
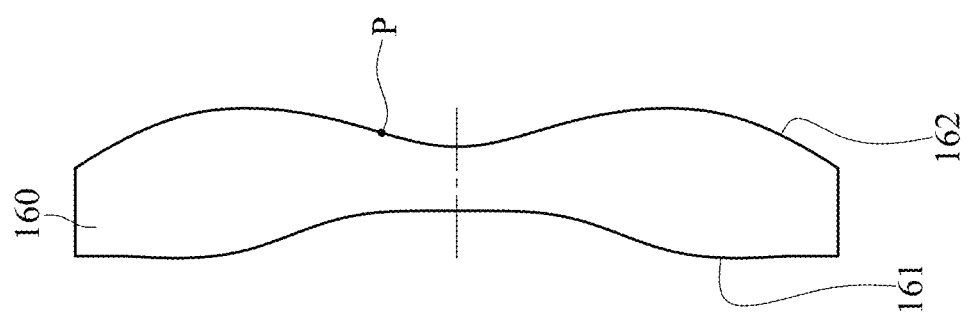
FIG. 25 shows a schematic view of an inflection point on the image-side surface of the sixth lens element according to the 1st embodiment of the present disclosure.

The sixth lens element has an image-side surface being concave in a paraxial region thereof; therefore, it is favorable for reducing the back focal length so as to keep the photographing lens assembly in compact size. The image-side surface of the sixth lens element has at least one inflection point; therefore, it is favorable for improving the Petzval field, reducing distortion, preventing vignetting and reducing the size of the photographing lens assembly. The sixth lens element can have negative refractive power; therefore, it is favorable for balancing the refractive power distribution on the image side, correcting aberrations, and preventing the size of the electronic device from being overly large due to an overly long back focal length. Please refer to FIG. 25, which shows a schematic view of an inflection point P on the image-side surface of the sixth lens element according to the 1st embodiment of the present disclosure.

When a focal length of the photographing lens assembly is f, a focal length of the first lens element is f1, a focal length of the second lens element is f2, a focal length of the third lens element is f3, a focal length of the fourth lens element is f4, a focal length of the fifth lens element is f5, and a focal length of the sixth lens element is f6, the following condition is satisfied: $(|f/f1|+|f/f3|+|f/f5|)/(|f/f2|+|f/f4|+|f/f6|)<1.0$. Therefore, it is favorable for balancing the refractive power distribution of the photographing lens assembly so as to provide a better aberration correction capability and to reduce the sensitivity. Preferably, the following condition can be satisfied: $(|f/f1|+|f/f3|+|f/f5|)/(|f/f2|+|f/f4|+|f/f6|)<0.55$. More preferably, the following condition can also be satisfied: $(|f/f1|+|f/f3|+|f/f5|)/(|f/f2|+|f/f4|+|f/f6|)<0.45$.

According to the present disclosure, the photographing lens assembly further includes an aperture stop. When an axial distance between the aperture stop and the image-side surface of the sixth lens element is SD, and an axial distance between an object-side surface of the first lens element and the image-side surface of the sixth lens element is TD, the following condition can be satisfied: $0.72<SD/TD<1.0$. Therefore, adjusting the position of the aperture stop with respect to the six lens elements is favorable for balancing between the field of view and the total track length, such that the photographing lens assembly is more applicable to various applications. Preferably, the following condition can also be satisfied: $0.72<SD/TD<0.95$.

When the focal length of the photographing lens assembly is f, and a curvature radius of an image-side surface of the fifth lens element is R10, the following condition can be satisfied: $-0.90<f/R10<9.0$. Therefore, it is favorable for balancing the refractive power distribution on the image side of the photographing lens assembly so as to prevent a total reflection due to an overly large incident angle on the surfaces of the lens elements. Preferably, the following condition can be satisfied: $-0.60<f/R10<3.0$. More preferably, the following condition can also be satisfied: $-0.40<f/R10<2.0$.

When an axial distance between the object-side surface of the first lens element and an image surface is TL, and the focal length of the photographing lens assembly is f, the following condition can be satisfied: $1.70<TL/f<5.0$. Therefore, it is favorable for obtaining a balance between the total track length and the field of view in order to minimize the total track length for various applications. Preferably, the following condition can be satisfied: $1.75<TL/f<3.0$. More preferably, the following condition can also be satisfied: $1.90<TL/f<2.60$.

When a central thickness of the first lens element is CT1, and an axial distance between the first lens element and the second lens element is T12, the following condition can be satisfied: $0.10<CT1/T12<3.3$. Therefore, it is favorable for providing a retro-focus configuration on the object side of the photographing lens assembly. Preferably, the following condition can also be satisfied: $0.20<CT1/T12<1.0$.

When an Abbe number of the sixth lens element is V6, and a refractive index of the sixth lens element is N6, the following condition can be satisfied: $7.0<V6/N6<33.0$. Therefore, a large density difference exists between a high-dispersion material (low Abbe number) and air, and it helps to obtain a stronger refractive capability, such that light is properly refracted within a shorter distance, thereby reducing the size of the photographing lens assembly and improving the Petzval field. Preferably, the following condition can also be satisfied: $10.0<V6/N6<25.0$.

When the focal length of the fourth lens element is f4, and the focal length of the fifth lens element is f5, the following condition can be satisfied: $|f4/f5|<2.0$. Therefore, it is favorable for balancing the refractive power distribution so as to reduce the sensitivity of the photographing lens assembly. Preferably, the following condition can be satisfied: $|f4/f5|<1.0$. More preferably, the following condition can also be satisfied: $|f4/f5|<0.55$.

When a curvature radius of an object-side surface of the sixth lens element is R11, and a curvature radius of the image-side surface of the sixth lens element is R12, the following condition can be satisfied: $-3.50<(R11+R12)/(R11-R12)<2.50$. Therefore, it is favorable for reducing the incident angle and refraction angle on surfaces of the sixth lens element so as to prevent stray light. Preferably, the following condition can be satisfied: $-1.0<(R11+R12)/(R11-R12)<1.50$. More preferably, the following condition can also be satisfied: $0<(R11+R12)/(R11-R12)<1.30$.

When a curvature radius of an object-side surface of the second lens element is R3, and a curvature radius of the image-side surface of the second lens element is R4, the following condition can be satisfied: $0<(R3+R4)/(R3-R4)<3.50$. Therefore, it is favorable for controlling the shape of the second lens element and correcting the traveling direction of light rays with a large angle of view while improving peripheral image quality. Preferably, the following condition can also be satisfied: $0.10<(R3+R4)/(R3-R4)<2.0$.

When the focal length of the photographing lens assembly is f, the focal length of the first lens element is f1, and the focal length of the second lens element is f2, the following condition can be satisfied: $|f2/f1|<0.60$. Therefore, it is favorable for adjusting the refractive power distribution of the first lens element and the second lens element so as to provide a wider field of view. Preferably, the following condition can also be satisfied: $|f2/f1|<0.40$.

When a central thickness of the second lens element is CT2, and a central thickness of the fourth lens element is CT4, the following condition can be satisfied: $1.05<CT4/CT2<3.0$. Therefore, it is favorable for balancing the thicknesses of the second lens element and the fourth lens element so as to reduce the converging distance of light rays and thereby reducing the total track length.

When half of a maximum field of view of the photographing lens assembly is HFOV, the following condition can be satisfied: $1.20<\tan(HFOV)<2.50$. Therefore, controlling the field of view of the photographing lens assembly is favorable for providing a wider field of view and capturing more image data.

When an axial distance between the second lens element and the third lens element is T23, an axial distance between the fourth lens element and the fifth lens element is T45, the central thickness of the second lens element is CT2, and the central thickness of the fourth lens element is CT4, the following condition can be satisfied: $0<(T23+T45)/(CT2+CT4)<0.20$. Therefore, it is favorable for obtaining a proper space arrangement of the photographing lens assembly, which allows the lens elements to have proper spacing among lens elements and helps to correct aberrations.

When the axial distance between the fourth lens element and the fifth lens element is T45, an axial distance between the fifth lens element and the sixth lens element is T56, and the central thickness of the fourth lens element is CT4, the following condition can be satisfied: $(T45+T56)/CT4<1.0$. Therefore, it is favorable for obtaining a balance between the thicknesses of the lens elements and the axial distances between every adjacent lens element on the image side of the photographing lens assembly so as to ensure that the lens elements are tightly arranged, thereby controlling the length of the barrel member. Preferably, the following condition can be satisfied: $(T45+T56)/CT4<0.55$. More preferably, the following condition can also be satisfied: $(T45+T56)/CT4<0.35$.

When the axial distance between the object-side surface of the first lens element and the image surface is TL, and a maximum image height of the photographing lens assembly (half of a diagonal length of an effective photosensitive area of an image sensor) is ImgH, the following condition can be satisfied: $1.0<TL/ImgH<2.0$. Therefore, it is favorable for miniaturizing the photographing lens assembly and having a sufficient range of light capture for increasing image brightness.

When the focal length of the photographing lens assembly is f, and an entrance pupil diameter of the photographing lens assembly is EPD, the following condition can be satisfied: $1.20<f/EPD<2.30$. Therefore, it is favorable for increasing the amount of incident light so as to increase illuminance for obtaining a much clearer image. Preferably, the following condition can also be satisfied: $1.20<f/EPD<2.10$.

When an Abbe number of the third lens element is V3, and a refractive index of the third lens element is N3, the following condition can be satisfied: $10.0<V3/N3<15.0$. Therefore, it is favorable for increasing the density difference between the third lens element and air so as to enhance the capability of correcting chromatic aberration of the third lens element.

When the axial distance between the object-side surface of the first lens element and the image surface is TL, the maximum image height of the photographing lens assembly is ImgH, and the entrance pupil diameter of the photographing lens assembly is EPD, the following condition can be satisfied: $4.0<TL^2/(ImgH\times EPD)<8.30$. Therefore, it is favorable for having a sufficiently large entrance pupil and image size to increase image brightness. Furthermore, it is favorable for obtaining high image quality and a high-end specification in a limited and short space, making the photographing lens assembly to be more applicable.

When the focal length of the second lens element is f2, and the focal length of the fifth lens element is f5, the following condition can be satisfied: $|f2/f5|<0.95$. Therefore, it is favorable for adjusting the refractive power distribution of the second lens element and the fifth lens element so as to strengthen light converging power on the object side of the photographing lens assembly, thereby obtaining compactness. Preferably, the following condition can also be satisfied: $|f2/f5|<0.50$.

When the focal length of the photographing lens assembly is f, a curvature radius of an object-side surface of one lens element of the six lens elements is Rf, and a curvature radius of an image-side surface of the lens element is Rr, the following condition can be satisfied: $|f/Rf|+|f/Rr|<0.30$. Therefore, it is favorable for reducing the curvature of the lens element so as to configure the lens element as a correction lens for correcting aberrations.

According to the present disclosure, the aperture stop can be located between the first lens element and the second lens element. When an axial distance between the aperture stop and the object-side surface of the second lens element is Dsr3, and an axial distance between the aperture stop and the image-side surface of the second lens element is Dsr4, the following condition can be satisfied: $0\leq Dsr3/Dsr4<0.50$. Therefore, it is favorable for balancing between a large angle of view and a short total track length for more applications. Preferably, the following condition can also be satisfied: $0\leq Dsr3/Dsr4<0.15$.

When the curvature radius of the object-side surface of the second lens element is R3, the curvature radius of the image-side surface of the second lens element is R4, a curvature radius of an object-side surface of the fourth lens element is R7, and a curvature radius of the image-side surface of the fourth lens element is R8, the following condition can be satisfied: $|R4/R3|+|R8/R7|<0.85$. Therefore, it is favorable for balancing the shapes of the second lens element and the fourth lens element so as to enlarge the field of view and the image height, thereby having a larger light receiving area. Preferably, the following condition can also be satisfied: $|R4/R3|+|R8/R7|<0.65$.

When the axial distance between the third lens element and the fourth lens element is T34, and the axial distance between the fourth lens element and the fifth lens element is T45, the following condition can be satisfied: $0<T45/T34<0.90$. Therefore, it is favorable for adjusting the axial distances between the lens elements so as to ensure the symmetry and compact configuration of the photographing lens assembly.

According to the present disclosure, at least three of the first lens element, the second lens element, the third lens element, the fourth lens element, the fifth lens element and the sixth lens element can be made of plastic material. Therefore, it is favorable for reducing the weight of the photographing lens assembly, and increasing the flexibility in shape design of the lens elements, such that the size of the photographing lens assembly is reduced.

According to the present disclosure, the aforementioned features and conditions can be utilized in numerous combinations so as to achieve corresponding effects.

According to the present disclosure, the lens elements of the photographing lens assembly can be made of either glass or plastic material. When the lens elements are made of glass material, the refractive power distribution of the photographing lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows for more control variables for eliminating aberrations thereof, the required number of the lens elements can be reduced, and the total track length of the photographing lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the photographing lens assembly, based on the corresponding image sensor, can be flat or curved, especially a curved surface being concave facing towards the object side of the photographing lens assembly.

According to the present disclosure, an image correction unit, such as a field flattener, can be optionally disposed between the lens element closest to the image side of the photographing lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave object-side surface and a planar image-side surface, and the thin transparent element is disposed near the image surface.

According to the present disclosure, the photographing lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the photographing lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the photographing lens assembly and thereby provides a wider field of view for the same.

According to the above description of the present disclosure, the following specific embodiments are provided for further explanation.

1st Embodiment

Figure 1:
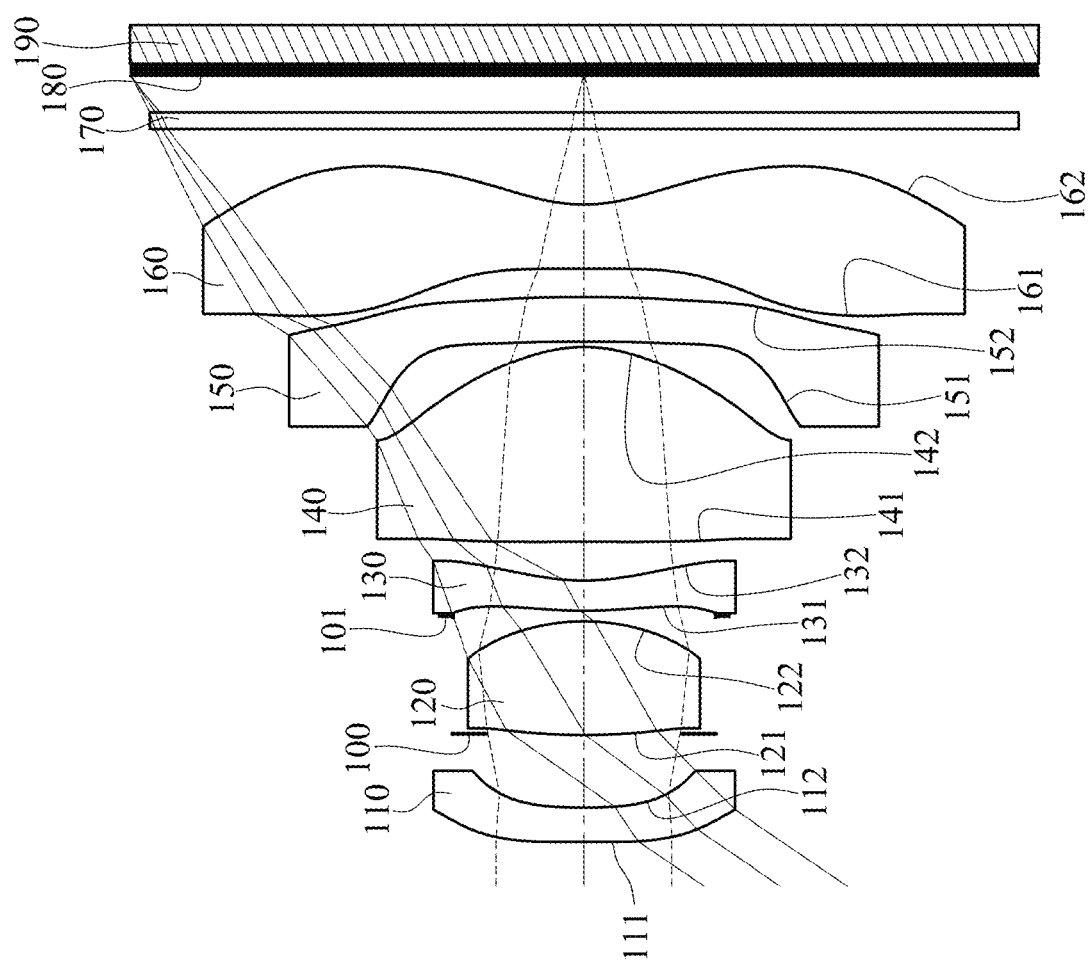
FIG. 1 is a schematic view of an image capturing unit according to the 1st embodiment of the present disclosure.
Figure 2:
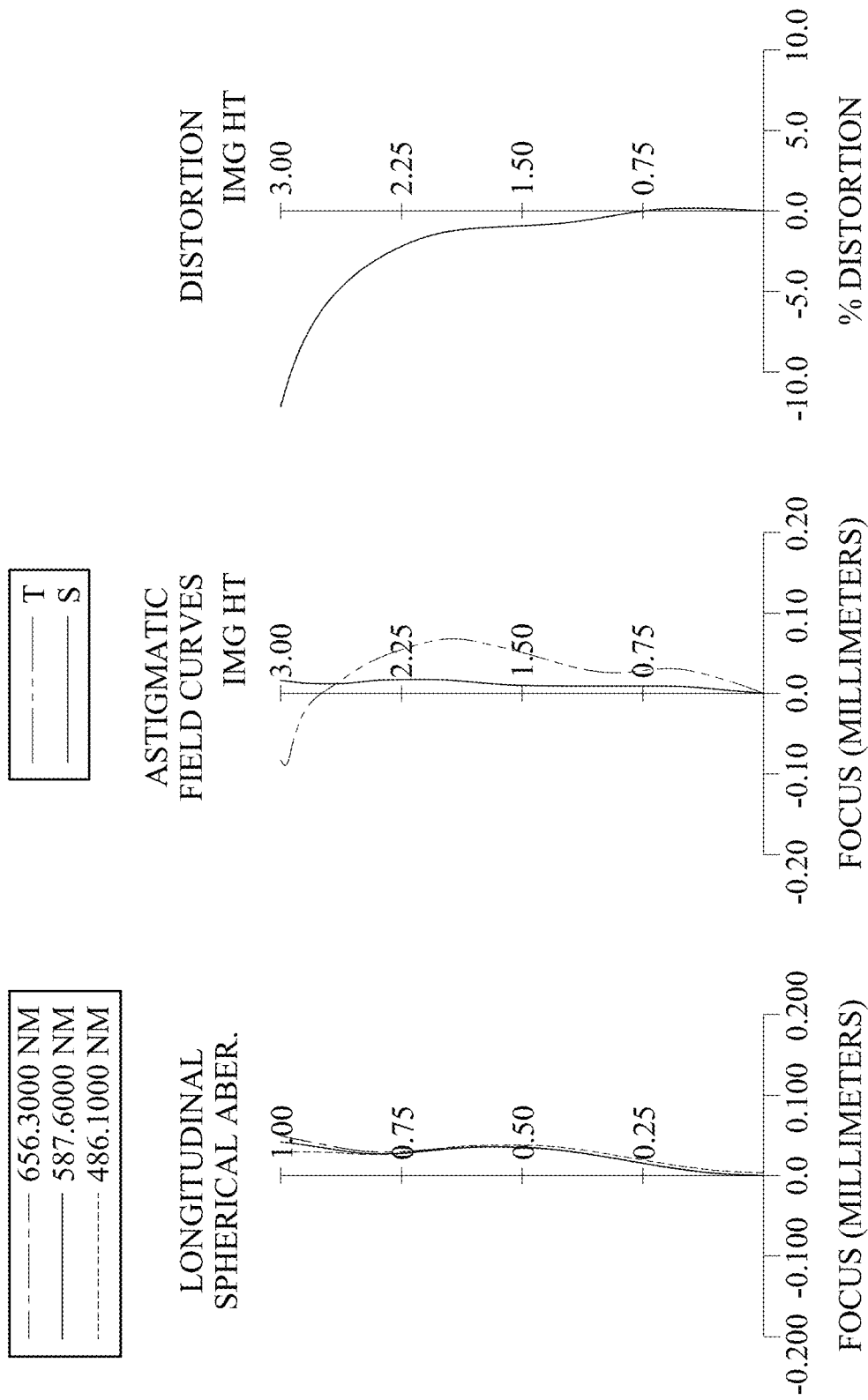
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the photographing lens assembly (its reference numeral is omitted) of the present disclosure and an image sensor 190. The photographing lens assembly includes, in order from an object side to an image side, a first lens element 110, an aperture stop 100, a second lens element 120, a stop 101, a third lens element 130, a fourth lens element 140, a fifth lens element 150, a sixth lens element 160, a filter 170 and an image surface 180. The photographing lens assembly includes six lens elements (110, 120, 130, 140, 150 and 160) with no additional lens element disposed between each of the adjacent six lens elements.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric.

The second lens element 120 with positive refractive power has an object-side surface 121 being convex in a paraxial region thereof and an image-side surface 122 being convex in a paraxial region thereof. The second lens element 120 is made of plastic material and has the object-side surface 121 and the image-side surface 122 being both aspheric.

The third lens element 130 with negative refractive power has an object-side surface 131 being convex in a paraxial region thereof and an image-side surface 132 being concave in a paraxial region thereof. The third lens element 130 is made of plastic material and has the object-side surface 131 and the image-side surface 132 being both aspheric.

The fourth lens element 140 with positive refractive power has an object-side surface 141 being concave in a paraxial region thereof and an image-side surface 142 being convex in a paraxial region thereof. The fourth lens element 140 is made of plastic material and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of plastic material and has the object-side surface 161 and the image-side surface 162 being both aspheric. The image-side surface 162 of the sixth lens element 160 has at least one inflection point.

The filter 170 is made of glass material and located between the sixth lens element 160 and the image surface 180, and will not affect the focal length of the photographing lens assembly. The image sensor 190 is disposed on or near the image surface 180 of the photographing lens assembly.

The equation of the aspheric surface profiles of the aforementioned lens elements of the 1st embodiment is expressed as follows:

$$X(Y) = (Y^2/R)/(1 + \mathrm{sqrt}(1 - (1+k) \times (Y/R)^2)) + \sum_{i} (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the photographing lens assembly of the image capturing unit according to the 1st embodiment, when a focal length of the photographing lens assembly is f, an f-number of the photographing lens assembly is Fno, and half of a maximum field of view of the photographing lens assembly is HFOV, these parameters have the following values: f=2.33 millimeters (mm), Fno=2.00, HFOV=55.8 degrees (deg.).

When an Abbe number of the third lens element 130 is V3, and a refractive index of the third lens element 130 is N3, the following condition is satisfied: V3/N3=12.86.

When an Abbe number of the sixth lens element 160 is V6, and a refractive index of the sixth lens element 160 is N6, the following condition is satisfied: V6/N6=16.11.

When a central thickness of the first lens element 110 is CT1, and an axial distance between the first lens element 110 and the second lens element 120 is T12, the following condition is satisfied: CT1/T12=0.47. In this embodiment, an axial distance between two adjacent lens elements is an air gap in a paraxial region between the two adjacent lens elements.

When a central thickness of the second lens element 120 is CT2, and a central thickness of the fourth lens element 140 is CT4, the following condition is satisfied: CT4/CT2=1.71.

When an axial distance between the third lens element 130 and the fourth lens element 140 is T34, and an axial distance between the fourth lens element 140 and the fifth lens element 150 is T45, the following condition is satisfied: T45/T34=0.14.

When the axial distance between the fourth lens element 140 and the fifth lens element 150 is T45, and an axial distance between the fifth lens element 150 and the sixth lens element 160 is T56, and the central thickness of the fourth lens element 140 is CT4, the following condition is satisfied: (T45+T56)/CT4=0.17.

When an axial distance between the second lens element 120 and the third lens element 130 is T23, the axial distance between the fourth lens element 140 and the fifth lens element 150 is T45, the central thickness of the second lens element 120 is CT2, and the central thickness of the fourth lens element 140 is CT4, the following condition is satisfied: (T23+T45)/(CT2+CT4)=0.051.

When the focal length of the photographing lens assembly is f, and a curvature radius of the image-side surface 152 of the fifth lens element 150 is R10, the following condition is satisfied: f/R10=−0.119.

When a curvature radius of the object-side surface 121 of the second lens element 120 is R3, and a curvature radius of the image-side surface 122 of the second lens element 120 is R4, the following condition is satisfied: (R3+R4)/(R3−R4)=0.507.

When a curvature radius of the object-side surface 161 of the sixth lens element 160 is R11, and a curvature radius of the image-side surface 162 of the sixth lens element 160 is R12, the following condition is satisfied: (R11+R12)/(R11−R12)=1.036.

When the curvature radius of the object-side surface 121 of the second lens element 120 is R3, the curvature radius of the image-side surface 122 of the second lens element 120 is R4, a curvature radius of the object-side surface 141 of the fourth lens element 140 is R7, and a curvature radius of the image-side surface 142 of the fourth lens element 140 is R8, the following condition is satisfied: |R4/R3|+|R8/R7|=0.342.

When a focal length of the first lens element 110 is f1, and a focal length of the second lens element 120 is f2, the following condition is satisfied: |f2/f1|=0.31.

When the focal length of the second lens element 120 is f2, and a focal length of the fifth lens element 150 is f5, the following condition is satisfied: |f2/f5|=0.03.

When a focal length of the fourth lens element 140 is f4, and the focal length of the fifth lens element 150 is f5, the following condition is satisfied: |f4/f5|=0.03.

When the focal length of the photographing lens assembly is f, the focal length of the first lens element 110 is f1, the focal length of the second lens element 120 is f2, a focal length of the third lens element 130 is f3, the focal length of the fourth lens element 140 is f4, the focal length of the fifth lens element 150 is f5, and a focal length of the sixth lens element 160 is f6, the following condition is satisfied: (|f/f1|+|f/f3|+|f/f5|)/(|f/f2|+|f/f4|+|f/f6|)=0.23.

When the focal length of the photographing lens assembly is f, and an entrance pupil diameter of the photographing lens assembly is EPD, the following condition is satisfied: f/EPD=2.00.

When half of the maximum field of view of the photographing lens assembly is HFOV, the following condition is satisfied: tan(HFOV)=1.47.

When an axial distance between the aperture stop 100 and the object-side surface 121 of the second lens element 120 is Dsr3, and an axial distance between the aperture stop 100 and the image-side surface 122 of the second lens element 120 is Dsr4, the following condition is satisfied: Dsr3/Dsr4=0.01.

When an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following condition is satisfied: SD/TD=0.83.

When an axial distance between the object-side surface 111 of the first lens element 110 and the image surface 180 is TL, and the focal length of the photographing lens assembly is f, the following condition is satisfied: TL/f=2.18.

When the axial distance between the object-side surface 111 of the first lens element 110 and the image surface 180 is TL, and a maximum image height of the photographing lens assembly is ImgH, the following condition is satisfied: TL/ImgH=1.69.

When the axial distance between the object-side surface 111 of the first lens element 110 and the image surface 180 is TL, the maximum image height of the photographing lens assembly is ImgH, and the entrance pupil diameter of the photographing lens assembly is EPD, the following condition is satisfied: $TL^2$/(ImgH×EPD)=7.39.

When the focal length of the photographing lens assembly is f, a curvature radius of an object-side surface of one lens element of the six lens elements is Rf, and a curvature radius of an image-side surface of the lens element of the six lens elements is Rr, one lens element (the fifth lens element 150) in this embodiment satisfies the following condition: |f/Rf|+|f/Rr|<0.30. The values of |f/Rf|+|f/Rr| for the six lens elements (110, 120, 130, 140, 150 and 160) are respectively presented in the following paragraph.

When the focal length of the photographing lens assembly is f, a curvature radius of the object-side surface 111 of the first lens element 110 is R1, and a curvature radius of the image-side surface 112 of the first lens element 110 is R2, the following condition is satisfied: |f/R1|+|f/R2|=0.66. When the curvature radius of the object-side surface 121 of the second lens element 120 is R3, and the curvature radius of the image-side surface 122 of the second lens element 120 is R4, the following condition is satisfied: |f/R3|+|f/R4|=2.23. When a curvature radius of the object-side surface 131 of the third lens element 130 is R5, and a curvature radius of the image-side surface 132 of the third lens element 130 is R6, the following condition is satisfied: |f/R5|+|f/R6|=2.41. When the curvature radius of the object-side surface 141 of the fourth lens element 140 is R7, and the curvature radius of the image-side surface 142 of the fourth lens element 140 is R8, the following condition is satisfied: |f/R7|+|f/R8|=2.34. When a curvature radius of the object-side surface 151 of the fifth lens element 150 is R9, and the curvature radius of the image-side surface 152 of the fifth lens element 150 is R10, the following condition is satisfied: |f/R9|+|f/R10|=0.19. When the curvature radius of the object-side surface 161 of the sixth lens element 160 is R11, and the curvature radius of the image-side surface 162 of the sixth lens element 160 is R12, the following condition is satisfied: |f/R11|+|f/R12|=2.23.

The detailed optical data of the 1st embodiment are shown in Table 1 and the aspheric surface data are shown in Table 2 below.

TABLE 1

1st Embodiment
f = 2.33 mm, Fno = 2.00, HFOV = 55.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −25.693 | (ASP) | 0.227 | Plastic | 1.545 | 56.1 | −6.44 |
| 2 | | 4.075 | (ASP) | 0.488 | | | | |
| 3 | Ape. Stop | Plano | | −0.008 | | | | |
| 4 | Lens 2 | 4.242 | (ASP) | 0.756 | Plastic | 1.545 | 56.1 | 2.01 |
| 5 | | −1.386 | (ASP) | 0.035 | | | | |
| 6 | Stop | Plano | | 0.035 | | | | |
| 7 | Lens 3 | 2.814 | (ASP) | 0.200 | Plastic | 1.656 | 21.3 | −4.95 |
| 8 | | 1.464 | (ASP) | 0.256 | | | | |
| 9 | Lens 4 | −65.757 | (ASP) | 1.293 | Plastic | 1.545 | 56.1 | 1.87 |
| 10 | | −1.011 | (ASP) | 0.035 | | | | |
| 11 | Lens 5 | −33.333 | (ASP) | 0.296 | Plastic | 1.639 | 23.5 | 72.64 |
| 12 | | −19.463 | (ASP) | 0.187 | | | | |
| 13 | Lens 6 | 60.792 | (ASP) | 0.424 | Plastic | 1.614 | 26.0 | −1.77 |
| 14 | | 1.062 | (ASP) | 0.500 | | | | |
| 15 | Filter | Plano | | 0.110 | Glass | 1.517 | 64.2 | — |
| 16 | | Plano | | 0.243 | | | | |
| 17 | Image | Plano | | — | | | | |

Note:
Reference wavelength is 587.6 nm (d-line).
An effective radius of the stop 101 (Surface 6) is 0.870 mm.

TABLE 2

Aspheric Coefficients

| Surface # | | | | | | |
|---|---|---|---|---|---|---|
| | 1 | 2 | 4 | 5 | 7 | 8 |
| k = | 9.0000E+01 | 1.9760E+01 | −9.1180E+00 | −8.8715E−01 | −3.1712E+01 | −4.3691E+00 |
| A4 = | 4.3994E−01 | 5.8740E−01 | 3.9881E−02 | −2.0733E−02 | −2.6351E−01 | −3.5328E−01 |
| A6 = | −3.7630E−01 | −7.0037E−02 | −7.1823E−02 | 6.4120E−02 | 6.9218E−01 | 8.7127E−01 |
| A8 = | 2.7347E−01 | −1.2312E+00 | 3.8298E−02 | −7.1140E−01 | −1.9220E+00 | −1.6493E+00 |
| A10 = | −2.1753E−03 | 4.5461E+00 | −4.9735E−01 | 9.1183E−01 | 2.9614E+00 | 1.8847E+00 |
| A12 = | −1.5728E−01 | −4.6228E+00 | 6.6906E−10 | −5.7706E−01 | −2.8573E+00 | −1.2536E+00 |
| A14 = | 5.6875E−02 | 5.4786E−01 | — | 1.7420E−11 | 1.2538E+00 | 3.6813E−01 |
| A16 = | — | 3.8578E−12 | — | — | 5.5880E−12 | 4.9236E−11 |

| Surface # | | | | | | |
|---|---|---|---|---|---|---|
| | 9 | 10 | 11 | 12 | 13 | 14 |
| k = | −9.9000E+01 | −9.8957E−01 | 9.0000E+01 | 2.9575E+01 | −9.9000E+01 | −8.7230E−01 |
| A4 = | 3.8228E−02 | 1.9753E−01 | −1.8408E−01 | −2.2018E−01 | −1.8041E−01 | −4.6704E−01 |
| A6 = | 2.3761E−02 | −4.8577E−02 | 6.6139E−01 | 6.1529E−01 | −1.3187E−02 | 3.2943E−01 |
| A8 = | −1.3193E−01 | −1.8941E−01 | −1.0183E+00 | −7.4007E−01 | 1.1218E−01 | −1.8480E−01 |
| A10 = | 2.3792E−01 | 2.5274E−01 | 7.8159E−01 | 4.5609E−01 | −6.8069E−02 | 7.4590E−02 |
| A12 = | −2.2170E−01 | −1.5613E−01 | −3.6565E−01 | −1.5410E−01 | 1.9939E−02 | −2.1125E−02 |
| A14 = | 9.6377E−02 | 5.3546E−02 | 9.2431E−02 | 2.6967E−02 | −3.2330E−03 | 4.0323E−03 |
| A16 = | −1.6239E−02 | −7.5850E−03 | −8.6271E−03 | −1.5233E−03 | 2.7979E−04 | −4.8921E−04 |
| A18 = | — | — | — | −1.8454E−04 | −1.0156E−05 | 3.3882E−05 |
| A20 = | — | — | — | 2.2862E−05 | — | −1.0176E−06 |

In Table 1, the curvature radius, the thickness and the focal length are shown in millimeters (mm). Surface numbers 0-17 represent the surfaces sequentially arranged from the object side to the image side along the optical axis. In Table 2, k represents the conic coefficient of the equation of the aspheric surface profiles. A4-A20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
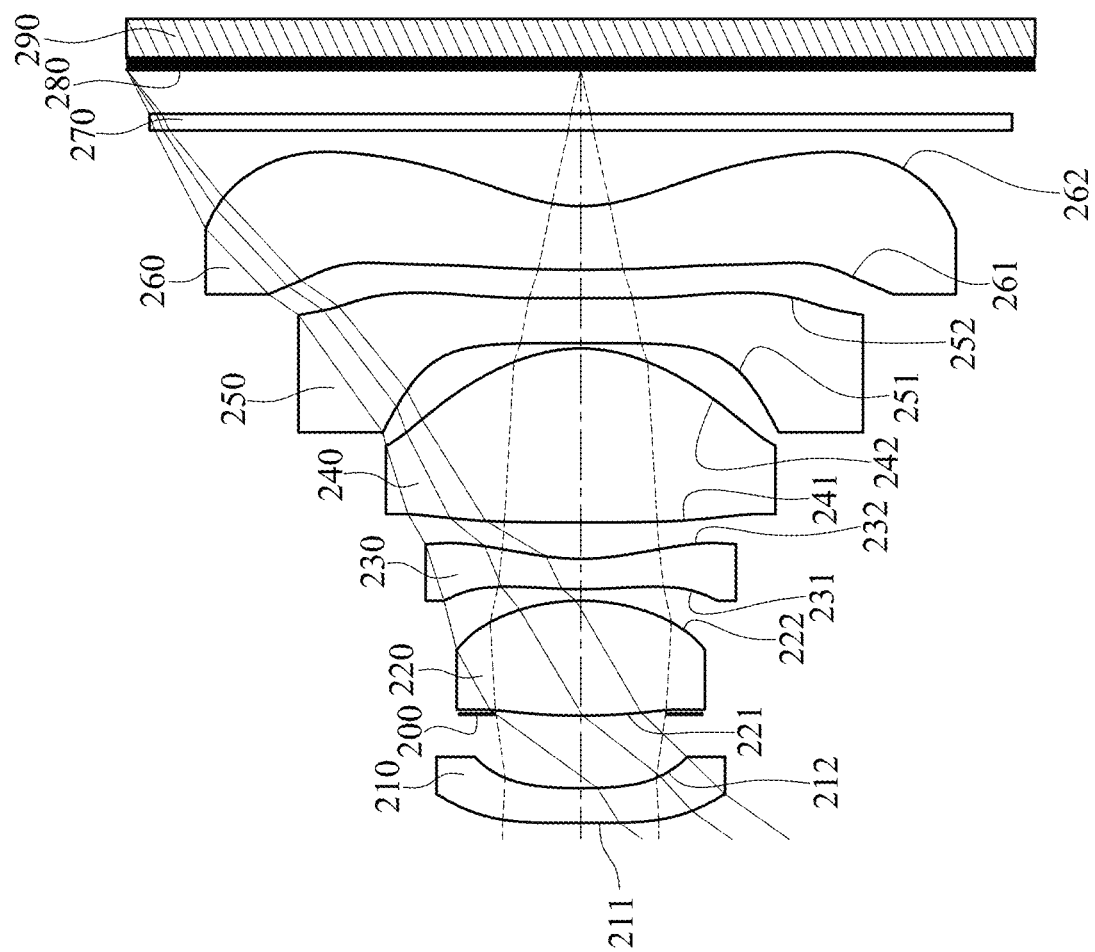
FIG. 3 is a schematic view of an image capturing unit according to the 2nd embodiment of the present disclosure.
Figure 4:
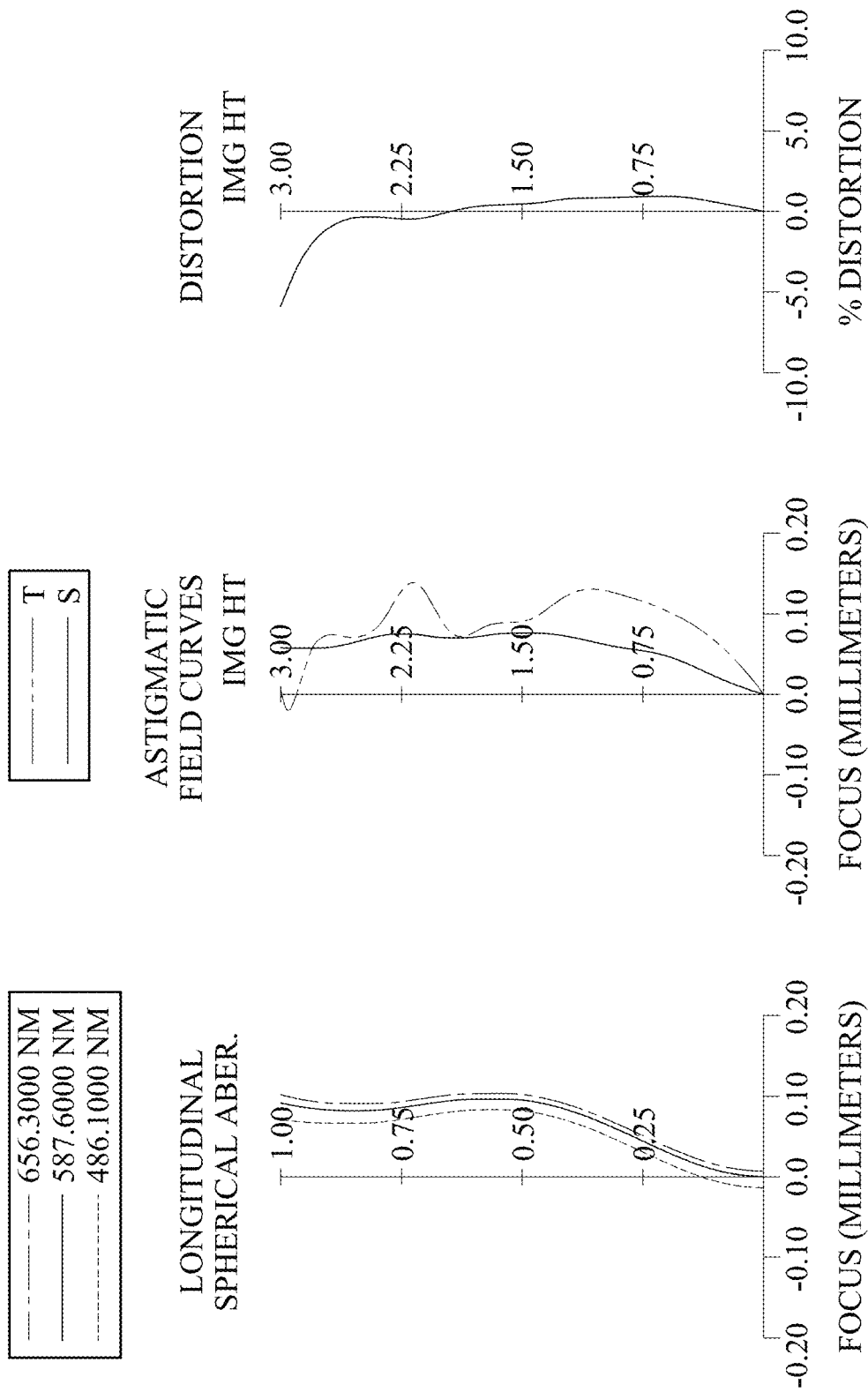
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the photographing lens assembly (its reference numeral is omitted) of the present disclosure and an image sensor 290. The photographing lens assembly includes, in order from an object side to an image side, a first lens element 210, an aperture stop 200, a second lens element 220, a third lens element 230, a fourth lens element 240, a fifth lens element 250, a sixth lens element 260, a filter 270 and an image surface 280. The photographing lens assembly includes six lens elements (210, 220, 230, 240, 250 and 260) with no additional lens element disposed between each of the adjacent six lens elements.

The first lens element 210 with negative refractive power has an object-side surface 211 being concave in a paraxial region thereof and an image-side surface 212 being concave in a paraxial region thereof. The first lens element 210 is made of plastic material and has the object-side surface 211 and the image-side surface 212 being both aspheric.

The second lens element 220 with positive refractive power has an object-side surface 221 being convex in a paraxial region thereof and an image-side surface 222 being convex in a paraxial region thereof. The second lens element 220 is made of glass material and has the object-side surface 221 and the image-side surface 222 being both aspheric.

The third lens element 230 with negative refractive power has an object-side surface 231 being convex in a paraxial region thereof and an image-side surface 232 being concave in a paraxial region thereof. The third lens element 230 is made of glass material and has the object-side surface 231 and the image-side surface 232 being both aspheric.

The fourth lens element 240 with positive refractive power has an object-side surface 241 being concave in a paraxial region thereof and an image-side surface 242 being convex in a paraxial region thereof. The fourth lens element 240 is made of plastic material and has the object-side surface 241 and the image-side surface 242 being both aspheric.

The fifth lens element 250 with positive refractive power has an object-side surface 251 being convex in a paraxial region thereof and an image-side surface 252 being concave in a paraxial region thereof. The fifth lens element 250 is made of plastic material and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of plastic material and has the object-side surface 261 and the image-side surface 262 being both aspheric. The image-side surface 262 of the sixth lens element 260 has at least one inflection point.

The filter 270 is made of glass material and located between the sixth lens element 260 and the image surface 280, and will not affect the focal length of the photographing lens assembly. The image sensor 290 is disposed on or near the image surface 280 of the photographing lens assembly.

The detailed optical data of the 2nd embodiment are shown in Table 3 and the aspheric surface data are shown in Table 4 below.

TABLE 3

2nd Embodiment
f = 2.21 mm, Fno = 2.15, HFOV = 54.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −25.929 | (ASP) | 0.229 | Plastic | 1.545 | 56.1 | −6.34 |
| 2 | | 3.998 | (ASP) | 0.490 | | | | |
| 3 | Ape. Stop | Plano | | −0.010 | | | | |
| 4 | Lens 2 | 4.120 | (ASP) | 0.760 | Glass | 1.547 | 53.6 | 2.00 |
| 5 | | −1.397 | (ASP) | 0.076 | | | | |
| 6 | Lens 3 | 2.866 | (ASP) | 0.201 | Glass | 1.673 | 32.1 | −4.79 |
| 7 | | 1.475 | (ASP) | 0.242 | | | | |
| 8 | Lens 4 | −80.902 | (ASP) | 1.150 | Plastic | 1.545 | 56.1 | 1.93 |
| 9 | | −1.045 | (ASP) | 0.035 | | | | |
| 10 | Lens 5 | 38.310 | (ASP) | 0.297 | Plastic | 1.639 | 23.5 | 62.73 |
| 11 | | 874.722 | (ASP) | 0.189 | | | | |
| 12 | Lens 6 | 15.458 | (ASP) | 0.420 | Plastic | 1.566 | 37.4 | −2.00 |
| 13 | | 1.043 | (ASP) | 0.500 | | | | |
| 14 | Filter | Plano | | 0.110 | Glass | 1.517 | 64.2 | — |
| 15 | | Plano | | 0.290 | | | | |
| 16 | Image | Plano | | — | | | | |

Note:
Reference wavelength is 587.6 nm (d-line).

TABLE 4

Aspheric Coefficients

| Surface # | | | | | |
|---|---|---|---|---|---|
| 1 | 2 | 4 | 5 | 6 | 7 |
| k = 9.0000E+01 | 1.4790E+01 | −1.4515E+01 | −1.4109E−01 | −7.8528E+01 | −6.0410E+00 |
| A4 = 4.4927E−01 | 5.9803E−01 | 3.7485E−02 | −6.1588E−02 | −3.0660E−01 | −3.6587E−01 |
| A6 = −3.9651E−01 | −6.2570E−02 | −3.1390E−02 | 1.3974E−02 | 6.5919E−01 | 8.6775E−01 |
| A8 = 2.9186E−01 | −1.2308E+00 | −2.2921E−01 | −5.9066E−01 | −1.8792E+00 | −1.6476E+00 |
| A10 = −7.0085E−03 | 4.5491E+00 | −2.2022E−01 | 6.5918E−01 | 2.9665E+00 | 1.8887E+00 |
| A12 = −1.6043E−01 | −4.6228E+00 | — | −5.3381E−01 | −2.8573E+00 | −1.2537E+00 |
| A14 = 5.8921E−02 | 5.4787E−01 | — | −6.0610E−08 | 1.2538E+00 | 3.6812E−01 |
| A16 = — | — | — | — | −6.1403E−10 | −2.6860E−06 |

| Surface # | | | | | |
|---|---|---|---|---|---|
| 8 | 9 | 10 | 11 | 12 | 13 |
| k = −9.9000E+01 | −7.4014E−01 | 2.0000E+01 | −1.0000E+00 | 8.8899E+00 | −9.0473E−01 |
| A4 = 8.4902E−02 | 1.2308E−01 | −2.5970E−01 | 1.5661E−01 | 7.2062E−02 | −3.8445E−01 |
| A6 = −6.6936E−03 | 1.1958E−03 | 8.5808E−01 | 4.1830E−01 | −1.1533E−01 | 2.8680E−01 |
| A8 = −1.3590E−01 | −1.8098E−01 | −2.0933E+00 | −1.0680E+00 | 8.7873E−03 | −2.1598E−01 |
| A10 = 2.4743E−01 | 2.4823E−01 | 2.5892E+00 | 1.1953E+00 | 7.7721E−02 | 1.2283E−01 |
| A12 = −2.2170E−01 | −1.5615E−01 | −1.8472E+00 | −7.5448E−01 | −5.8865E−02 | −4.5993E−02 |
| A14 = 9.6388E−02 | 5.3485E−02 | 6.9984E−01 | 2.8399E−01 | 1.8577E−02 | 1.0806E−02 |
| A16 = −1.6238E−02 | −7.6400E−03 | −1.0720E−01 | −6.3024E−02 | −2.7560E−03 | −1.5333E−03 |
| A18 = — | — | — | 7.6023E−03 | 1.5828E−04 | 1.2022E−04 |
| A20 = — | — | — | −3.8420E−04 | — | −4.0059E−06 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.21 | |f4/f5| | 0.03 |
| Fno | 2.15 | (|f/f1| + |f/f3| + |f/f5|)/(|f/f2| + |f/f4| + |f/f6|) | 0.25 |
| HFOV [deg.] | 54.8 | f/EPD | 2.15 |
| V3/N3 | 19.19 | tan(HFOV) | 1.42 |
| V6/N6 | 23.88 | Dsr3/Dsr4 | 0.01 |
| CT1/T12 | 0.48 | SD/TD | 0.82 |
| CT4/CT2 | 1.51 | TL/f | 2.25 |
| T45/T34 | 0.14 | TL/ImgH | 1.66 |
| (T45 + T56)/CT4 | 0.19 | TL$^2$/(ImgH × EPD) | 8.02 |
| (T23 + T45)/(CT2 + CT4) | 0.058 | |f/R1| + |f/R2| | 0.64 |
| f/R10 | 0.003 | |f/R3| + |f/R4| | 2.12 |
| (R3 + R4)/(R3 − R4) | 0.493 | |f/R5| + |f/R6| | 2.27 |
| (R11 + R12)/(R11 − R12) | 1.145 | |f/R7| + |f/R8| | 2.15 |
| |R4/R3| + |R8/R7| | 0.352 | |f/R9| + |f/R10| | 0.06 |
| |f2/f1| | 0.32 | |f/R11| + |f/R12| | 2.27 |
| |f2/f5| | 0.03 | — | — |

3rd Embodiment

Figure 5:
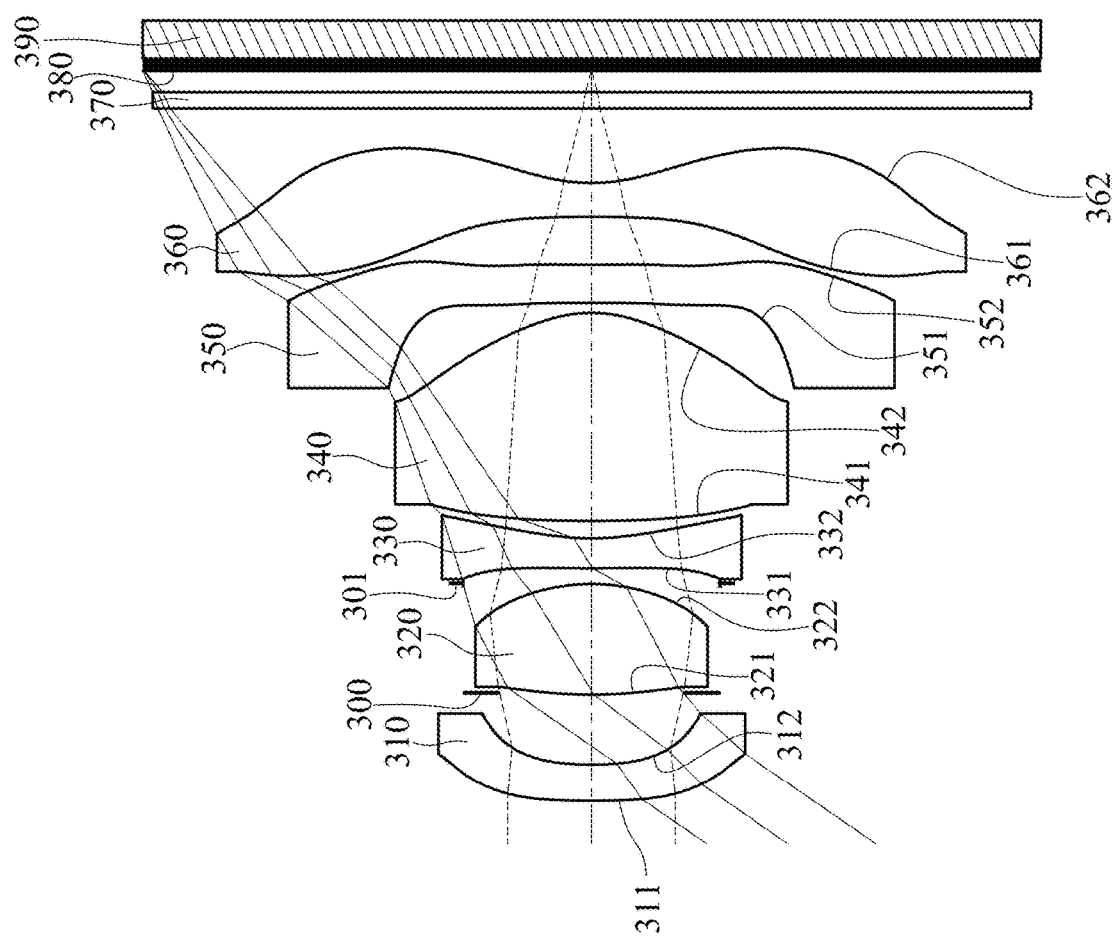
FIG. 5 is a schematic view of an image capturing unit according to the 3rd embodiment of the present disclosure.
Figure 6:
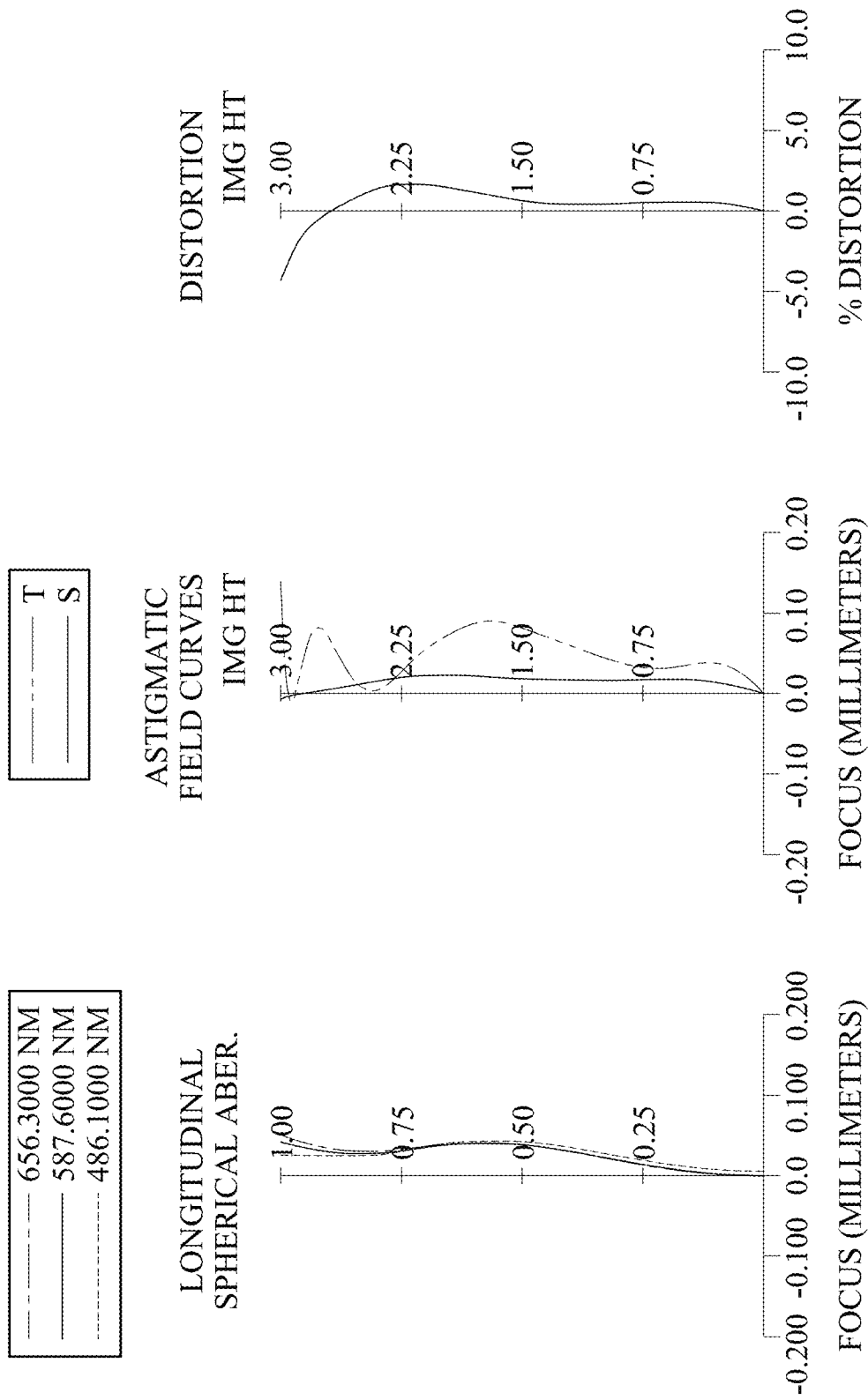
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the photographing lens assembly (its reference numeral is omitted) of the present disclosure and an image sensor 390. The photographing lens assembly includes, in order from an object side to an image side, a first lens element 310, an aperture stop 300, a second lens element 320, a stop 301, a third lens element 330, a fourth lens element 340, a fifth lens element 350, a sixth lens element 360, a filter 370 and an image surface 380. The photographing lens assembly includes six lens elements (310, 320, 330, 340, 350 and 360) with no additional lens element disposed between each of the adjacent six lens elements.

The first lens element 310 with negative refractive power has an object-side surface 311 being convex in a paraxial region thereof and an image-side surface 312 being concave in a paraxial region thereof. The first lens element 310 is made of plastic material and has the object-side surface 311 and the image-side surface 312 being both aspheric.

The second lens element 320 with positive refractive power has an object-side surface 321 being convex in a paraxial region thereof and an image-side surface 322 being convex in a paraxial region thereof. The second lens element 320 is made of plastic material and has the object-side surface 321 and the image-side surface 322 being both aspheric.

The third lens element 330 with negative refractive power has an object-side surface 331 being convex in a paraxial region thereof and an image-side surface 332 being concave in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric.

The fifth lens element 350 with negative refractive power has an object-side surface 351 being convex in a paraxial region thereof and an image-side surface 352 being concave in a paraxial region thereof. The fifth lens element 350 is made of plastic material and has the object-side surface 351 and the image-side surface 352 being both aspheric.

The sixth lens element 360 with negative refractive power has an object-side surface 361 being concave in a paraxial region thereof and an image-side surface 362 being concave in a paraxial region thereof. The sixth lens element 360 is made of plastic material and has the object-side surface 361 and the image-side surface 362 being both aspheric. The image-side surface 362 of the sixth lens element 360 has at least one inflection point.

The filter 370 is made of glass material and located between the sixth lens element 360 and the image surface 380, and will not affect the focal length of the photographing lens assembly. The image sensor 390 is disposed on or near the image surface 380 of the photographing lens assembly.

The detailed optical data of the 3rd embodiment are shown in Table 5 and the aspheric surface data are shown in Table 6 below.

TABLE 5

3rd Embodiment
f = 2.16 mm, Fno = 1.93, HFOV = 55.3 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 10.125 | (ASP) | 0.244 | Plastic | 1.545 | 56.1 | −5.19 |
| 2 |  | 2.192 | (ASP) | 0.482 |  |  |  |  |
| 3 | Ape. Stop | Plano |  | −0.012 |  |  |  |  |
| 4 | Lens 2 | 3.251 | (ASP) | 0.741 | Plastic | 1.545 | 56.1 | 1.81 |
| 5 |  | −1.297 | (ASP) | 0.005 |  |  |  |  |
| 6 | Stop | Plano |  | 0.101 |  |  |  |  |
| 7 | Lens 3 | 9.833 | (ASP) | 0.200 | Plastic | 1.639 | 23.5 | −3.32 |
| 8 |  | 1.728 | (ASP) | 0.116 |  |  |  |  |
| 9 | Lens 4 | 8.045 | (ASP) | 1.399 | Plastic | 1.545 | 56.1 | 1.57 |
| 10 |  | −0.896 | (ASP) | 0.067 |  |  |  |  |
| 11 | Lens 5 | 80.405 | (ASP) | 0.255 | Plastic | 1.639 | 23.3 | −15.68 |
| 12 |  | 8.893 | (ASP) | 0.322 |  |  |  |  |
| 13 | Lens 6 | −11.248 | (ASP) | 0.230 | Plastic | 1.582 | 30.2 | −1.78 |
| 14 |  | 1.150 | (ASP) | 0.500 |  |  |  |  |
| 15 | Filter | Plano |  | 0.110 | Glass | 1.517 | 64.2 | — |
| 16 |  | Plano |  | 0.141 |  |  |  |  |
| 17 | Image | Plano |  | — |  |  |  |  |

Note:
Reference wavelength is 587.6 nm (d-line).
An effective radius of the stop 301 (Surface 6) is 0.860 mm.

TABLE 6

Aspheric Coefficients

| Surface # | 1 | 2 | 4 | 5 | 7 | 8 |
|---|---|---|---|---|---|---|
| k = | 1.5636E+01 | 5.7058E+00 | −7.4523E+00 | −1.3897E+00 | −2.0058E+01 | −3.4889E+00 |
| A4 = | 4.0841E−01 | 5.5851E−01 | 2.4646E−02 | −6.1542E−03 | −3.2244E−01 | −3.5304E−01 |
| A6 = | −4.2808E−01 | −7.0390E−02 | −6.8656E−02 | −1.7370E−01 | 7.5848E−01 | 8.7392E−01 |
| A8 = | 6.5105E−01 | −1.0826E+00 | −3.2364E−02 | −4.5024E−01 | −1.9737E+00 | −1.5831E+00 |
| A10 = | −6.9813E−01 | 5.0779E+00 | −4.1944E−01 | 9.5840E−01 | 3.0299E+00 | 1.8590E+00 |
| A12 = | 4.8785E−01 | −4.6228E+00 | −8.7357E−11 | −8.0398E−01 | −2.8635E+00 | −1.2532E+00 |
| A14 = | −1.7642E−01 | 5.4786E−01 | — | 3.1247E−04 | 1.2539E+00 | 3.6514E−01 |
| A16 = | — | −3.4633E−15 | — | — | −2.2626E−12 | 1.7405E−05 |

| Surface # | 9 | 10 | 11 | 12 | 13 | 14 |
|---|---|---|---|---|---|---|
| k = | 4.2604E+01 | −1.3012E+00 | −9.0475E+01 | −8.7748E+01 | 1.3487E+01 | −8.6854E−01 |
| A4 = | 8.1778E−03 | 2.1389E−01 | −4.4793E−01 | −5.3725E−01 | −1.1062E−01 | −3.5093E−01 |
| A6 = | 3.9849E−02 | −6.0693E−02 | 1.5498E+00 | 1.4563E+00 | −2.7528E−01 | 1.5144E−01 |
| A8 = | −1.3472E−01 | −1.9202E−01 | −2.4504E+00 | −1.7295E+00 | 8.1728E−02 | −2.7372E−02 |
| A10 = | 2.4203E−01 | 2.5361E−01 | 2.2426E+00 | 1.1438E+00 | −4.4483E−02 | −1.4571E−02 |
| A12 = | −2.2464E−01 | −1.5550E−01 | −1.3031E+00 | −4.6730E−01 | 1.2216E−02 | 1.1327E−02 |
| A14 = | 9.4373E−02 | 5.3770E−02 | 4.3193E−01 | 1.2180E−01 | −1.8858E−03 | −3.4191E−03 |
| A16 = | −1.3580E−02 | −7.6137E−03 | −6.2258E−02 | −1.9861E−02 | 1.5663E−04 | 5.4520E−04 |
| A18 = | — | — | — | 1.8550E−03 | −5.4800E−06 | −4.4920E−05 |
| A20 = | — | — | — | −7.6008E−05 | — | 1.5020E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.16 | \|f4/f5\| | 0.10 |
| Fno | 1.93 | (\|f/f1\| + \|f/f3\| + \|f/f5\|)/ | 0.32 |
| | | (\|f/f2\| + \|f/f4\| + \|f/f6\|) | |
| HFOV [deg.] | 55.3 | f/EPD | 1.93 |
| V3/N3 | 14.34 | tan(HFOV) | 1.44 |
| V6/N6 | 19.09 | Dsr3/Dsr4 | 0.02 |
| CT1/T12 | 0.52 | SD/TD | 0.83 |
| CT4/CT2 | 1.89 | TL/f | 2.27 |
| T45/T34 | 0.58 | TL/ImgH | 1.63 |
| (T45 + T56)/CT4 | 0.28 | TL$^2$/(ImgH × EPD) | 7.15 |
| (T23 + T45)/(CT2 + CT4) | 0.081 | \|f/R1\| + \|f/R2\| | 1.20 |
| f/R10 | 0.243 | \|f/R3\| + \|f/R4\| | 2.33 |
| (R3 + R4)/(R3 − R4) | 0.429 | \|f/R5\| + \|f/R6\| | 1.47 |
| (R11 + R12)/(R11 − R12) | 0.815 | \|f/R7\| + \|f/R8\| | 2.68 |
| \|R4/R3\| + \|R8/R7\| | 0.511 | \|f/R9\| + \|f/R10\| | 0.27 |
| \|f2/f1\| | 0.35 | \|f/R11\| + \|f/R12\| | 2.07 |
| \|f2/f5\| | 0.12 | — | — |

4th Embodiment

Figure 7:
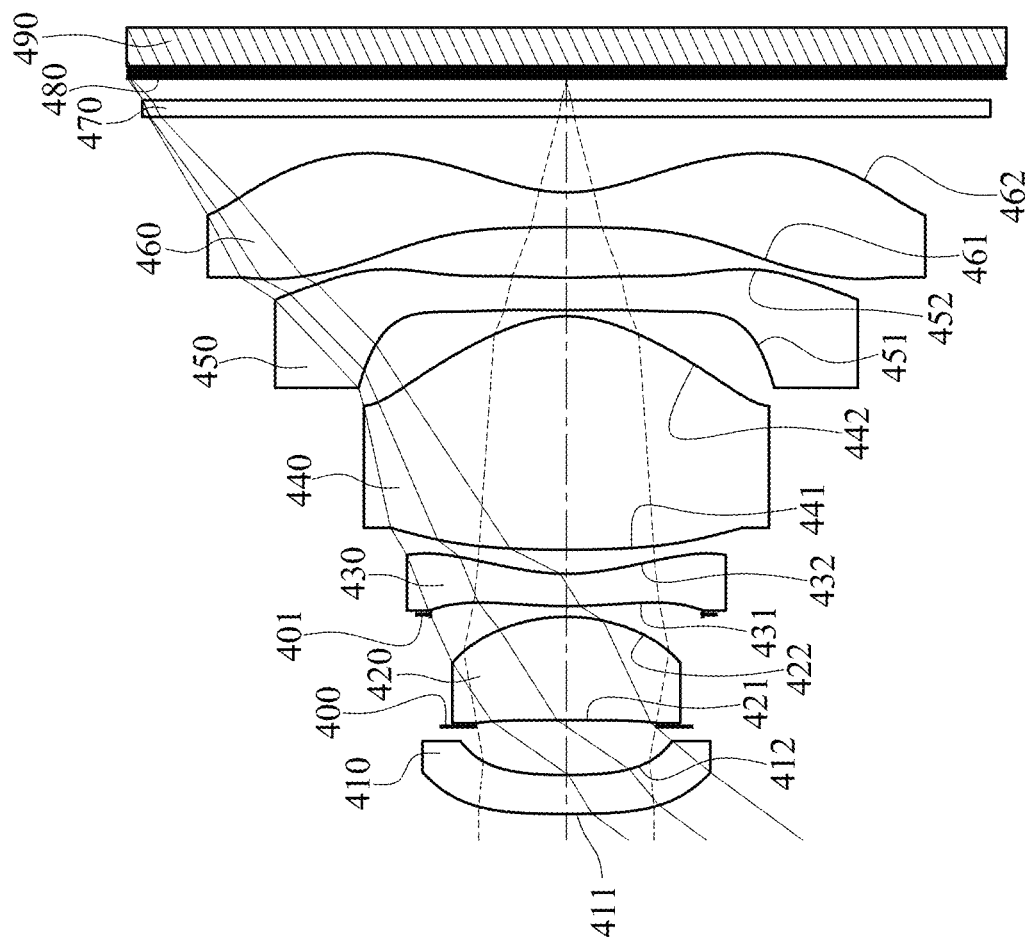
FIG. 7 is a schematic view of an image capturing unit according to the 4th embodiment of the present disclosure.
Figure 8:
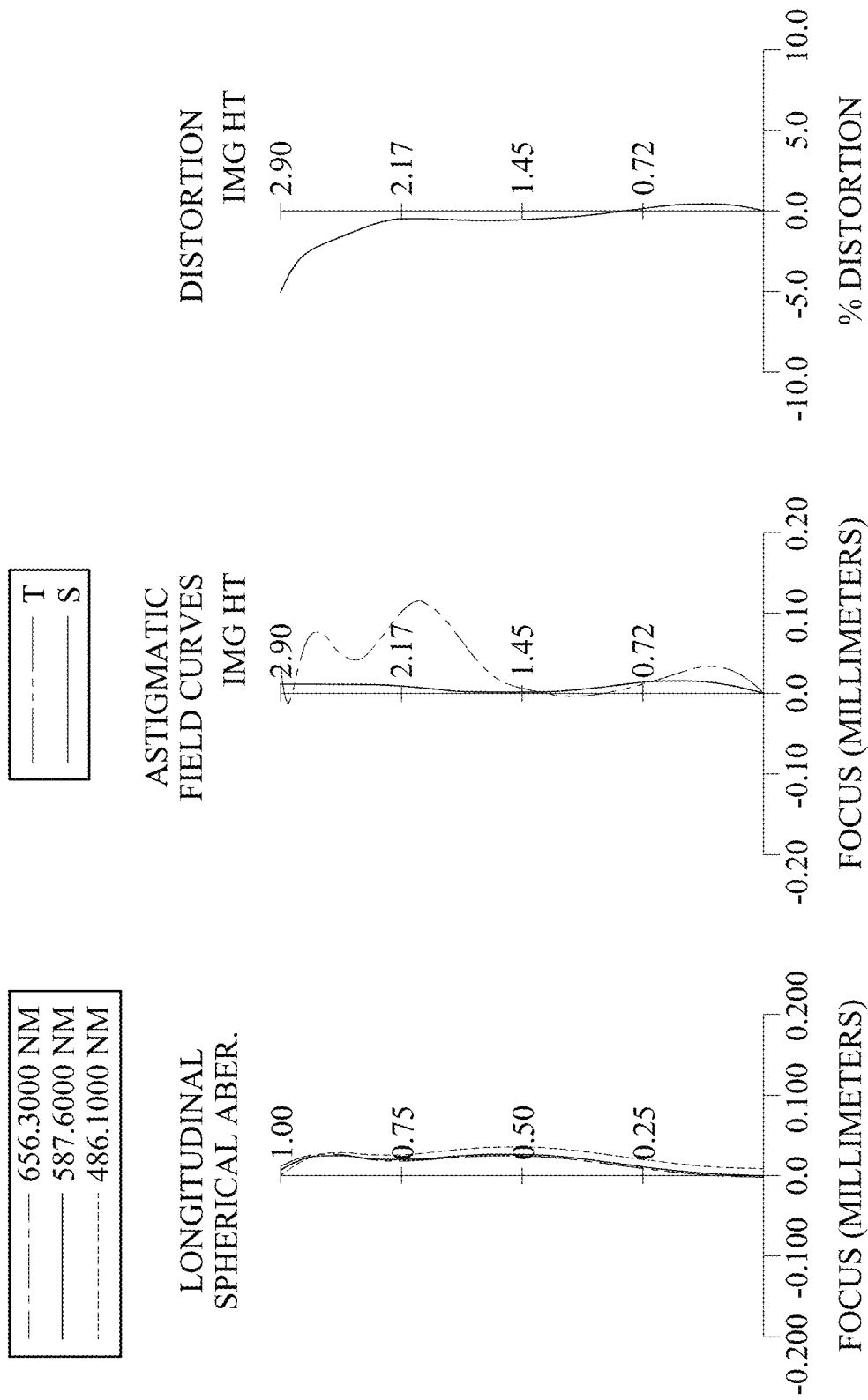
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the photographing lens assembly (its reference numeral is omitted) of the present disclosure and an image sensor 490. The photographing lens assembly includes, in order from an object side to an image side, a first lens element 410, an aperture stop 400, a second lens element 420, a stop 401, a third lens element 430, a fourth lens element 440, a fifth lens element 450, a sixth lens element 460, a filter 470 and an image surface 480. The photographing lens assembly includes six lens elements (410, 420, 430, 440, 450 and 460) with no additional lens element disposed between each of the adjacent six lens elements.

The first lens element 410 with negative refractive power has an object-side surface 411 being convex in a paraxial region thereof and an image-side surface 412 being concave in a paraxial region thereof. The first lens element 410 is made of plastic material and has the object-side surface 411 and the image-side surface 412 being both aspheric.

The second lens element 420 with positive refractive power has an object-side surface 421 being concave in a paraxial region thereof and an image-side surface 422 being convex in a paraxial region thereof. The second lens element 420 is made of plastic material and has the object-side surface 421 and the image-side surface 422 being both aspheric.

The third lens element 430 with negative refractive power has an object-side surface 431 being convex in a paraxial region thereof and an image-side surface 432 being concave in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric.

The fifth lens element 450 with negative refractive power has an object-side surface 451 being convex in a paraxial region thereof and an image-side surface 452 being concave in a paraxial region thereof. The fifth lens element 450 is made of plastic material and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of plastic material and has the object-side surface 461 and the image-side surface 462 being both aspheric. The image-side surface 462 of the sixth lens element 460 has at least one inflection point.

The filter 470 is made of glass material and located between the sixth lens element 460 and the image surface 480, and will not affect the focal length of the photographing lens assembly. The image sensor 490 is disposed on or near the image surface 480 of the photographing lens assembly.

The detailed optical data of the 4th embodiment are shown in Table 7 and the aspheric surface data are shown in Table 8 below.

TABLE 7

4th Embodiment
f = 2.24 mm, Fno = 1.93, HFOV = 53.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 12.370 | (ASP) | 0.257 | Plastic | 1.582 | 30.2 | −9.80 |
| 2 | | 3.875 | (ASP) | 0.321 | | | | |
| 3 | Ape. Stop | Plano | | 0.042 | | | | |
| 4 | Lens 2 | −31.097 | (ASP) | 0.684 | Plastic | 1.545 | 56.1 | 2.13 |
| 5 | | −1.129 | (ASP) | 0.015 | | | | |
| 6 | Stop | Plano | | 0.055 | | | | |
| 7 | Lens 3 | 3.078 | (ASP) | 0.214 | Plastic | 1.639 | 23.5 | −3.98 |
| 8 | | 1.355 | (ASP) | 0.159 | | | | |
| 9 | Lens 4 | 9.524 | (ASP) | 1.545 | Plastic | 1.545 | 56.1 | 1.51 |
| 10 | | −0.851 | (ASP) | 0.040 | | | | |
| 11 | Lens 5 | 7.485 | (ASP) | 0.214 | Plastic | 1.650 | 21.5 | −9.11 |
| 12 | | 3.270 | (ASP) | 0.335 | | | | |

TABLE 7-continued

4th Embodiment
f = 2.24 mm, Fno = 1.93, HFOV = 53.7 deg.

| Surface # | | Curvature Radius | | Thickness | Material | Index | Abbe # | Focal Length |
|---|---|---|---|---|---|---|---|---|
| 13 | Lens 6 | −18.453 | (ASP) | 0.230 | Plastic | 1.582 | 30.2 | −1.75 |
| 14 | | 1.084 | (ASP) | 0.500 | | | | |
| 15 | Filter | Plano | | 0.110 | Glass | 1.517 | 64.2 | — |
| 16 | | Plano | | 0.142 | | | | |
| 17 | Image | Plano | | — | | | | |

Note:
Reference wavelength is 587.6 nm (d-line).
An effective radius of the stop 401 (Surface 6) is 0.900 mm.

TABLE 8

Aspheric Coefficients

| | Surface # | | | | | |
|---|---|---|---|---|---|---|
| | 1 | 2 | 4 | 5 | 7 | 8 |
| k = | 2.1774E+01 | 6.2448E+00 | −2.0058E+01 | −1.4266E+00 | −1.4072E+01 | −4.5187E+00 |
| A4 = | 3.6464E−01 | 5.3204E−01 | −2.8475E−02 | −1.0727E−02 | −3.3921E−01 | −3.6941E−01 |
| A6 = | −3.6719E−01 | 4.7436E−01 | −9.9373E−02 | −2.3147E−01 | 7.0678E−01 | 8.6355E−01 |
| A8 = | 8.0671E−01 | −1.0631E+00 | −1.0696E−01 | −3.3235E−01 | −1.8382E+00 | −1.5974E+00 |
| A10 = | −1.1491E+00 | 5.1729E+00 | −8.6371E−01 | 6.9569E−01 | 3.0299E+00 | 1.8494E+00 |
| A12 = | 1.0536E+00 | −4.6228E+00 | −8.7391E−11 | −8.0398E−01 | −2.9700E+00 | −1.2364E+00 |
| A14 = | −4.2910E−01 | 5.4786E−01 | — | 3.1247E−04 | 1.2539E+00 | 3.4867E−01 |
| A16 = | — | −3.4646E−15 | — | — | −2.2621E−12 | 1.7405E−05 |

| | Surface # | | | | | |
|---|---|---|---|---|---|---|
| | 9 | 10 | 11 | 12 | 13 | 14 |
| k = | 3.9603E+01 | −1.3573E+00 | −9.0475E+01 | −4.9671E+01 | 4.2970E+01 | −8.7403E−01 |
| A4 = | 4.8561E−02 | 2.1403E−01 | −6.2349E−01 | −6.3276E−01 | −8.6997E−02 | −3.8844E−01 |
| A6 = | 3.9365E−02 | −6.3246E−02 | 1.8254E+00 | 1.6941E+00 | −4.7631E−02 | 2.1871E−01 |
| A8 = | −1.4572E−01 | −1.8746E−01 | −2.5582E+00 | −2.0709E+00 | 9.2921E−02 | −9.7630E−02 |
| A10 = | 2.3568E−01 | 2.5574E−01 | 2.0147E+00 | 1.4508E+00 | −5.0978E−02 | 2.7945E−02 |
| A12 = | −2.1624E−01 | −1.5519E−01 | −9.6366E−01 | −6.3842E−01 | 1.4769E−02 | −4.5984E−03 |
| A14 = | 9.5762E−02 | 5.3457E−02 | 2.5709E−01 | 1.8017E−01 | −2.4389E−03 | 3.1311E−04 |
| A16 = | −1.5742E−02 | −8.0528E−03 | −2.9902E−02 | −3.1688E−02 | 2.1710E−04 | 1.6813E−05 |
| A18 = | — | — | — | 3.1610E−03 | −8.1030E−06 | −3.8523E−06 |
| A20 = | — | — | — | −1.3653E−04 | — | 1.6205E−07 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.24 | |f4/f5| | 0.17 |
| Fno | 1.93 | (|f/f1| + |f/f3| + |f/f5|)/(|f/f2| + |f/f4| + |f/f6|) | 0.27 |
| HFOV [deg.] | 53.7 | f/EPD | 1.93 |
| V3/N3 | 14.34 | tan(HFOV) | 1.36 |
| V6/N6 | 19.09 | Dsr3/Dsr4 | 0.06 |
| CT1/T12 | 0.71 | SD/TD | 0.86 |
| CT4/CT2 | 2.26 | TL/f | 2.17 |
| T45/T34 | 0.25 | TL/ImgH | 1.68 |
| (T45 + T56)/CT4 | 0.24 | TL²/(ImgH × EPD) | 7.04 |

| -continued | | | |
|---|---|---|---|
| 4th Embodiment | | | |
| (T23 + T45)/(CT2 + CT4) | 0.049 | |f/R1| + |f/R2| | 0.76 |
| f/R10 | 0.684 | |f/R3| + |f/R4| | 2.05 |
| (R3 + R4)/(R3 − R4) | 1.075 | |f/R5| + |f/R6| | 2.38 |
| (R11 + R12)/(R11 − R12) | 0.889 | |f/R7| + |f/R8| | 2.86 |
| |R4/R3| + |R8/R7| | 0.126 | |f/R9| + |f/R10| | 0.98 |
| |f2/f1| | 0.22 | |f/R11| + |f/R12| | 2.18 |
| |f2/f5| | 0.23 | — | — |

5th Embodiment

Figure 9:
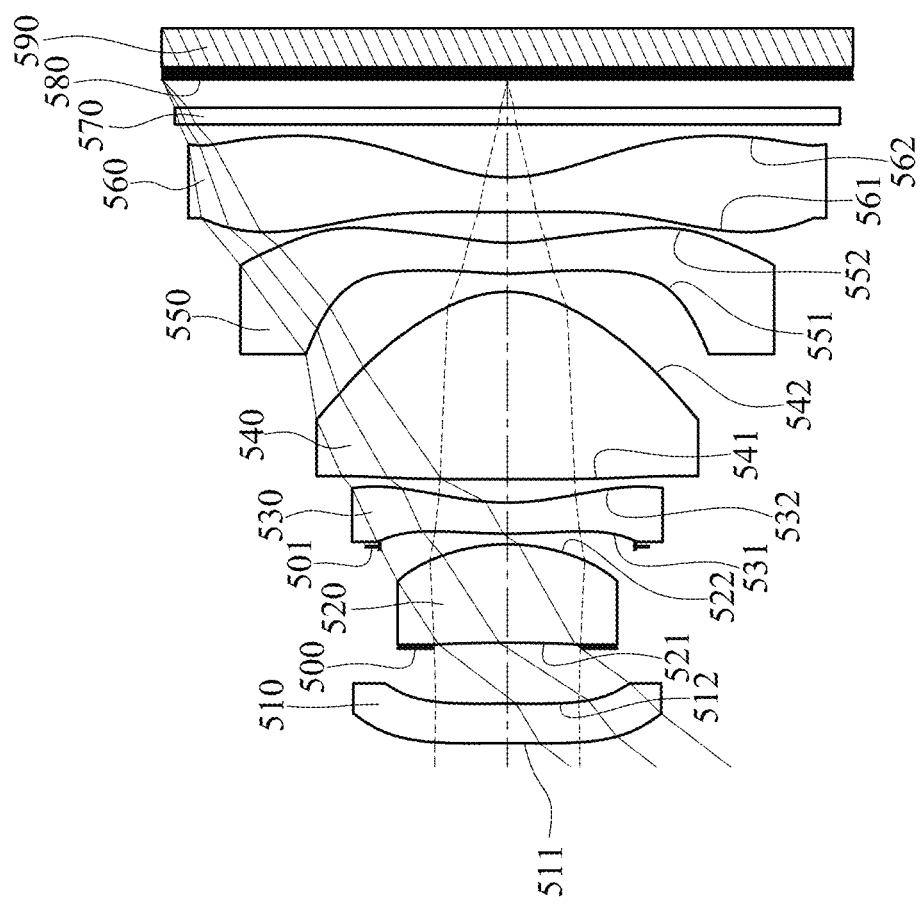
FIG. 9 is a schematic view of an image capturing unit according to the 5th embodiment of the present disclosure.
Figure 10:
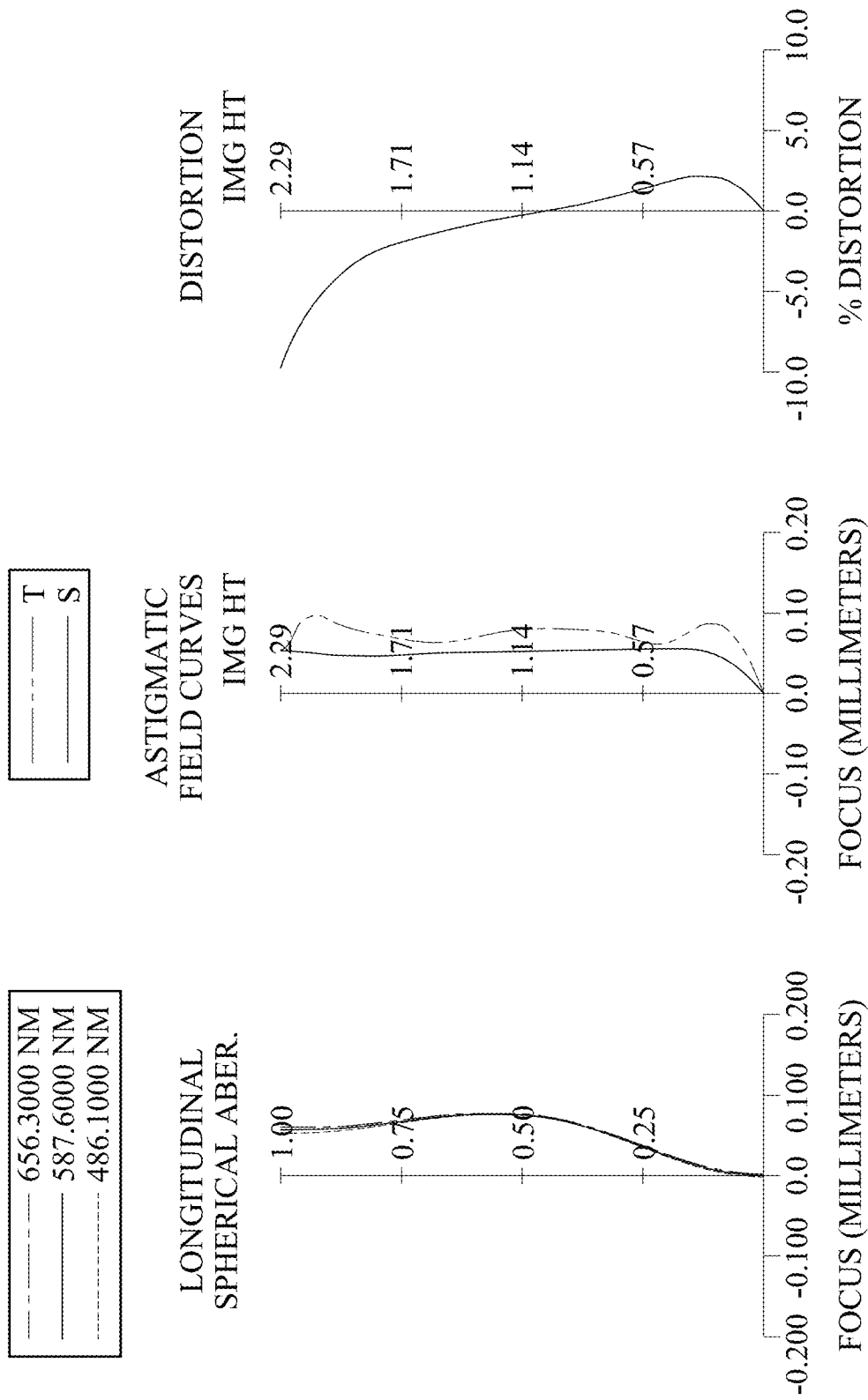
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the photographing lens assembly (its reference numeral is omitted) of the present disclosure and an image sensor 590. The photographing lens assembly includes, in order from an object side to an image side, a first lens element 510, an aperture stop 500, a second lens element 520, a stop 501, a third lens element 530, a fourth lens element 540, a fifth lens element 550, a sixth lens element 560, a filter 570 and an image surface 580. The photographing lens assembly includes six lens elements (510, 520, 530, 540, 550 and 560) with no additional lens element disposed between each of the adjacent six lens elements. The first lens element 510 with positive refractive power has an object-side surface 511 being concave in a paraxial region thereof and an image-side surface 512 being convex in a paraxial region thereof. The first lens element 510 is made of plastic material and has the object-side surface 511 and the image-side surface 512 being both aspheric.

The second lens element 520 with positive refractive power has an object-side surface 521 being concave in a paraxial region thereof and an image-side surface 522 being convex in a paraxial region thereof. The second lens element 520 is made of plastic material and has the object-side surface 521 and the image-side surface 522 being both aspheric.

The third lens element 530 with negative refractive power has an object-side surface 531 being convex in a paraxial region thereof and an image-side surface 532 being concave in a paraxial region thereof. The third lens element 530 is made of plastic material and has the object-side surface 531 and the image-side surface 532 being both aspheric.

The fourth lens element 540 with positive refractive power has an object-side surface 541 being concave in a paraxial region thereof and an image-side surface 542 being convex in a paraxial region thereof. The fourth lens element 540 is made of plastic material and has the object-side surface 541 and the image-side surface 542 being both aspheric.

The fifth lens element 550 with negative refractive power has an object-side surface 551 being convex in a paraxial region thereof and an image-side surface 552 being concave in a paraxial region thereof. The fifth lens element 550 is made of plastic material and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of plastic material and has the object-side surface 561 and the image-side surface 562 being both aspheric. The image-side surface 562 of the sixth lens element 560 has at least one inflection point.

The filter 570 is made of glass material and located between the sixth lens element 560 and the image surface 580, and will not affect the focal length of the photographing lens assembly. The image sensor 590 is disposed on or near the image surface 580 of the photographing lens assembly.

The detailed optical data of the 5th embodiment are shown in Table 9 and the aspheric surface data are shown in Table 10 below.

TABLE 9

5th Embodiment
f = 1.92 mm, Fno = 2.00, HFOV = 52.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −15.614 | (ASP) | 0.262 | Plastic | 1.545 | 56.1 | 836.02 |
| 2 | | −15.186 | (ASP) | 0.368 | | | | |
| 3 | Ape. Stop | Plano | | 0.034 | | | | |
| 4 | Lens 2 | −13.818 | (ASP) | 0.652 | Plastic | 1.545 | 56.1 | 2.39 |
| 5 | | −1.212 | (ASP) | −0.015 | | | | |
| 6 | Stop | Plano | | 0.085 | | | | |
| 7 | Lens 3 | 3.703 | (ASP) | 0.205 | Plastic | 1.639 | 23.5 | −4.13 |
| 8 | | 1.506 | (ASP) | 0.155 | | | | |
| 9 | Lens 4 | −232.470 | (ASP) | 1.240 | Plastic | 1.545 | 56.1 | 1.36 |
| 10 | | −0.738 | (ASP) | 0.120 | | | | |
| 11 | Lens 5 | 1.671 | (ASP) | 0.204 | Plastic | 1.650 | 21.5 | −5.14 |
| 12 | | 1.061 | (ASP) | 0.203 | | | | |
| 13 | Lens 6 | 23.224 | (ASP) | 0.230 | Plastic | 1.582 | 30.2 | −1.89 |
| 14 | | 1.048 | (ASP) | 0.350 | | | | |
| 15 | Filter | Plano | | 0.110 | Glass | 1.517 | 64.2 | — |
| 16 | | Plano | | 0.186 | | | | |
| 17 | Image | Plano | | — | | | | |

Note:
Reference wavelength is 587.6 nm (d-line).
An effective radius of the stop 501 (Surface 6) is 0.844 mm.

TABLE 10

Aspheric Coefficients

| | Surface # | | | | | |
|---|---|---|---|---|---|---|
| | 1 | 2 | 4 | 5 | 7 | 8 |
| k = | 1.6668E+01 | 7.4740E+00 | 2.1774E+01 | −1.6775E+00 | −1.6969E+01 | −4.0177E+00 |
| A4 = | 3.0692E−01 | 5.5115E−01 | −2.2751E−02 | 1.5699E−02 | −3.4189E−01 | −3.8884E−01 |
| A6 = | −4.5888E−01 | −2.0363E+00 | −1.1043E−01 | −1.2671E−01 | 6.8436E−01 | 8.4235E−01 |
| A8 = | 1.2231E+00 | 1.1281E+01 | −1.6901E−01 | −5.9493E−02 | −1.9825E+00 | −1.5980E+00 |

TABLE 10-continued

| Aspheric Coefficients | | | | | |
|---|---|---|---|---|---|
| A10 = −1.9731E+00 | −3.6869E+01 | −1.2965E+00 | 9.0509E−01 | 3.0299E+00 | 1.8564E+00 |
| A12 = 1.7088E+00 | 6.7909E+01 | −8.7535E−11 | −8.0398E−01 | −2.7931E+00 | −1.2235E+00 |
| A14 = −5.9055E−01 | −6.3284E+01 | — | 3.1247E−04 | 1.2539E+00 | 3.4826E−01 |
| A16 = — | 2.2732E+01 | — | — | −2.2572E−12 | 1.7405E−05 |

| Surface # | | | | | |
|---|---|---|---|---|---|
| 9 | 10 | 11 | 12 | 13 | 14 |
| k = 9.0000E+01 | −1.2225E+00 | −9.0475E+01 | −2.4542E+01 | 8.9860E+01 | −8.4534E−01 |
| A4 = 3.5121E−02 | 1.8362E−01 | −4.4642E−01 | −4.0186E−01 | −8.2495E−02 | −4.4030E−01 |
| A6 = 3.6806E−02 | −7.4792E−02 | 1.0747E+00 | 1.0519E+00 | −2.8599E−02 | 3.0696E−01 |
| A8 = −1.4983E−01 | −1.8769E−01 | −1.4619E+00 | −1.4215E+00 | 6.9185E−02 | −1.7982E−01 |
| A10 = 2.3455E−01 | 2.5607E−01 | 1.0080E+00 | 1.1110E+00 | −3.9560E−02 | 6.7454E−02 |
| A12 = −2.1679E−02 | −1.5533E−01 | −3.8135E−01 | −5.5305E−01 | 1.2138E−02 | −1.3016E−02 |
| A14 = 9.4519E−02 | 5.3323E−02 | 6.1341E−02 | 1.7967E−01 | −2.1706E−03 | 2.5405E−04 |
| A16 = −1.2763E−02 | −8.0549E−03 | 1.0813E−04 | −3.6857E−02 | 2.1312E−04 | 3.7344E−04 |
| A18 = — | — | — | 4.3115E−03 | −8.8968E−06 | −6.2608E−05 |
| A20 = — | — | — | −2.1799E−04 | — | 3.2100E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 1.92 | \|f4/f5\| | 0.26 |
| Fno | 2.00 | (\|f/f1\| + \|f/f3\| + \|f/f5\|)/ | 0.26 |
| | | (\|f/f2\| + \|f/f4\| + \|f/f6\|) | |
| HFOV [deg.] | 52.5 | f/EPD | 2.00 |
| V3/N3 | 14.34 | tan(HFOV) | 1.30 |
| V6/N6 | 19.09 | Dsr3/Dsr4 | 0.05 |
| CT1/T12 | 0.65 | SD/TD | 0.83 |
| CT4/CT2 | 1.90 | TL/f | 2.29 |
| T45/T34 | 0.77 | TL/ImgH | 1.92 |
| (T45 + T56)/CT4 | 0.26 | TL$^2$/(ImgH × EPD) | 8.80 |
| (T23 + T45)/(CT2 + CT4) | 0.100 | \|f/R1\| + \|f/R2\| | 0.25 |
| f/R10 | 1.808 | \|f/R3\| + \|f/R4\| | 1.72 |
| (R3 + R4)/(R3 − R4) | 1.192 | \|f/R5\| + \|f/R6\| | 1.79 |
| (R11 + R12)/(R11 − R12) | 1.095 | \|f/R7\| + \|f/R8\| | 2.61 |
| \|R4/R3\| + \|R8/R7\| | 0.091 | \|f/R9\| + \|f/R10\| | 2.96 |
| \|f2/f1\| | 0.0029 | \|f/R11\| + \|f/R12\| | 1.91 |
| \|f2/f5\| | 0.47 | — | — |

6th Embodiment

Figure 11:
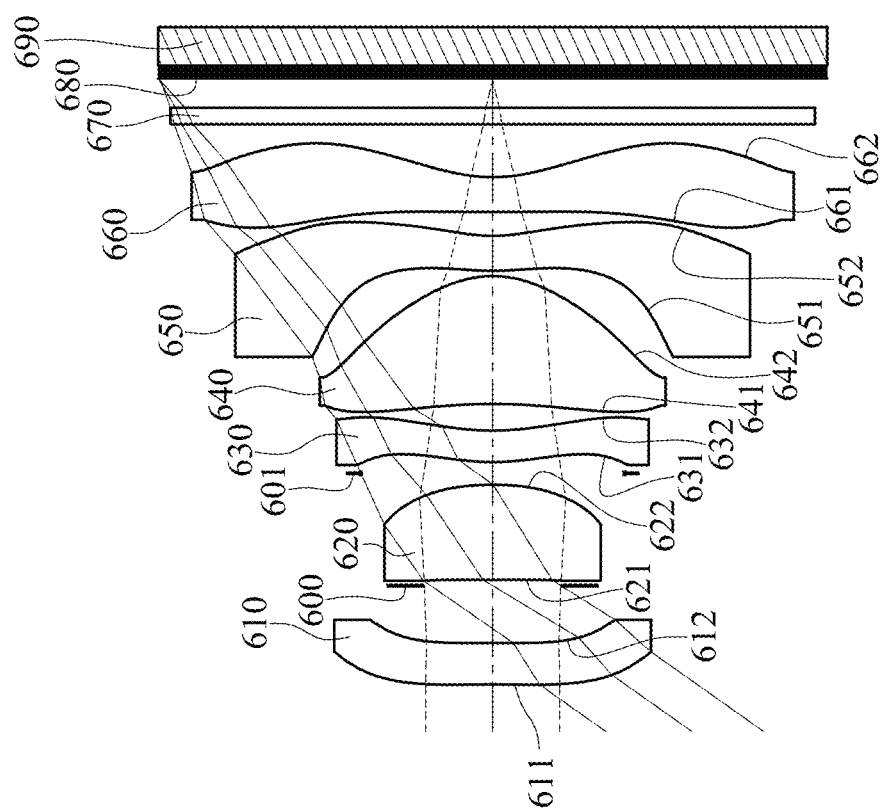
FIG. 11 is a schematic view of an image capturing unit according to the 6th embodiment of the present disclosure.
Figure 12:
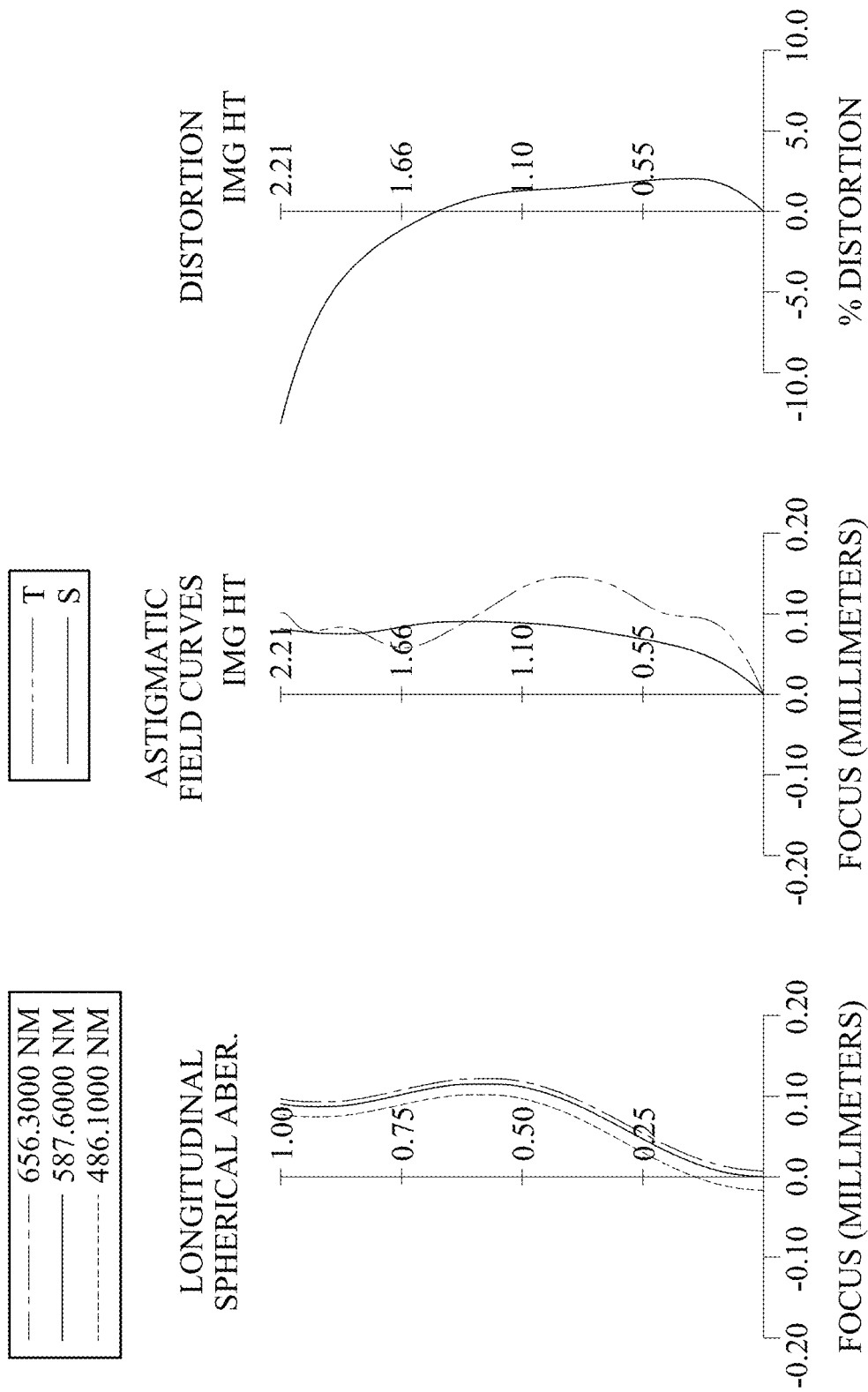
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the photographing lens assembly (its reference numeral is omitted) of the present disclosure and an image sensor 690. The photographing lens assembly includes, in order from an object side to an image side, a first lens element 610, an aperture stop 600, a second lens element 620, a stop 601, a third lens element 630, a fourth lens element 640, a fifth lens element 650, a sixth lens element 660, a filter 670 and an image surface 680. The photographing lens assembly includes six lens elements (610, 620, 630, 640, 650 and 660) with no additional lens element disposed between each of the adjacent six lens elements.

The first lens element 610 with negative refractive power has an object-side surface 611 being concave in a paraxial region thereof and an image-side surface 612 being convex in a paraxial region thereof. The first lens element 610 is made of plastic material and has the object-side surface 611 and the image-side surface 612 being both aspheric.

The second lens element 620 with positive refractive power has an object-side surface 621 being convex in a paraxial region thereof and an image-side surface 622 being convex in a paraxial region thereof. The second lens element 620 is made of plastic material and has the object-side surface 621 and the image-side surface 622 being both aspheric.

The third lens element 630 with positive refractive power has an object-side surface 631 being convex in a paraxial region thereof and an image-side surface 632 being concave in a paraxial region thereof. The third lens element 630 is made of plastic material and has the object-side surface 631 and the image-side surface 632 being both aspheric.

The fourth lens element 640 with positive refractive power has an object-side surface 641 being concave in a paraxial region thereof and an image-side surface 642 being convex in a paraxial region thereof. The fourth lens element 640 is made of plastic material and has the object-side surface 641 and the image-side surface 642 being both aspheric.

The fifth lens element 650 with negative refractive power has an object-side surface 651 being convex in a paraxial region thereof and an image-side surface 652 being concave in a paraxial region thereof. The fifth lens element 650 is made of plastic material and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of plastic material and has the object-side surface 661 and the image-side surface 662 being both aspheric. The image-side surface 662 of the sixth lens element 660 has at least one inflection point.

The filter 670 is made of glass material and located between the sixth lens element 660 and the image surface 680, and will not affect the focal length of the photographing lens assembly. The image sensor 690 is disposed on or near the image surface 680 of the photographing lens assembly.

The detailed optical data of the 6th embodiment are shown in Table 11 and the aspheric surface data are shown in Table 12 below.

TABLE 11

6th Embodiment
f = 1.77 mm, Fno = 2.00, HFOV = 54.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −11.129 | (ASP) | 0.274 | Plastic | 1.545 | 56.1 | −48.70 |
| 2 | | −19.333 | (ASP) | 0.379 | | | | |
| 3 | Ape. Stop | Plano | | 0.039 | | | | |
| 4 | Lens 2 | 74.265 | (ASP) | 0.629 | Plastic | 1.545 | 56.1 | 3.27 |
| 5 | | −1.822 | (ASP) | 0.075 | | | | |
| 6 | Stop | Plano | | 0.075 | | | | |
| 7 | Lens 3 | 1.497 | (ASP) | 0.208 | Plastic | 1.639 | 23.5 | 13.87 |
| 8 | | 1.704 | (ASP) | 0.176 | | | | |
| 9 | Lens 4 | −3.775 | (ASP) | 0.846 | Plastic | 1.545 | 56.1 | 1.42 |
| 10 | | −0.692 | (ASP) | 0.035 | | | | |
| 11 | Lens 5 | 1.694 | (ASP) | 0.231 | Plastic | 1.650 | 21.5 | −4.20 |
| 12 | | 0.990 | (ASP) | 0.158 | | | | |
| 13 | Lens 6 | 19.031 | (ASP) | 0.230 | Plastic | 1.582 | 30.2 | −1.93 |
| 14 | | 1.054 | (ASP) | 0.350 | | | | |
| 15 | Filter | Plano | | 0.110 | Glass | 1.517 | 64.2 | — |
| 16 | | Plano | | 0.194 | | | | |
| 17 | Image | Plano | | — | | | | |

Note:
Reference wavelength is 587.6 nm (d-line).
An effective radius of the stop 601 (Surface 6) is 0.870 mm.

TABLE 12

Aspheric Coefficients

| | Surface # | | | | | |
|---|---|---|---|---|---|---|
| | 1 | 2 | 4 | 5 | 7 | 8 |
| k = | −2.0058E+01 | 7.4740E+00 | −2.0058E+01 | 3.3078E+00 | −1.6301E+01 | −2.9353E+00 |
| A4 = | 3.2964E−01 | 6.2670E−01 | −1.1285E−01 | −4.5722E−01 | −3.4230E−01 | −3.9796E−01 |
| A6 = | −3.8834E−01 | −2.1490E+00 | −1.7335E−01 | 7.0544E−01 | 6.9374E−01 | 8.2089E−01 |
| A8 = | 7.4583E−01 | 1.1204E+01 | −2.0143E−01 | −6.6243E−01 | −1.9883E+00 | −1.5986E+00 |
| A10 = | −9.7144E−01 | −3.6107E+01 | −3.3809E+00 | −5.5453E−02 | 3.0299E+00 | 1.8687E+00 |
| A12 = | 7.5945E−01 | 6.7769E+01 | −8.6427E−11 | −8.0398E−01 | −2.8513E+00 | −1.2161E+00 |
| A14 = | −2.5170E−01 | −6.5635E+01 | — | 3.1247E−04 | 1.2539E+00 | 3.4299E−01 |
| A16 = | — | 2.4766E+01 | — | — | −2.2650E−12 | 1.7405E−05 |

| | Surface # | | | | | |
|---|---|---|---|---|---|---|
| | 9 | 10 | 11 | 12 | 13 | 14 |
| k = | −1.3749E+01 | −1.4275E+00 | −9.0475E+01 | −1.9741E+01 | 6.6999E+01 | −8.4468E−01 |
| A4 = | 3.3377E−02 | 1.4372E−01 | −4.0179E−01 | −2.7696E−01 | −7.7952E−02 | −5.2442E−01 |
| A6 = | 6.6961E−02 | −1.1178E−01 | 7.0881E−02 | 3.5528E−01 | 2.6868E−02 | 4.7189E−01 |
| A8 = | −1.3593E−01 | −1.8600E−01 | 8.6259E−01 | −1.5734E−01 | −5.9886E−03 | −3.5565E−01 |
| A10 = | 2.3675E−01 | 2.6582E−01 | −2.2376E+00 | −1.3793E−01 | −3.3017E−03 | 1.7303E−01 |
| A12 = | −2.1436E−01 | −1.4600E−01 | 2.3995E+00 | 2.1075E−01 | 5.9864E−03 | −5.3655E−02 |
| A14 = | 9.7216E−02 | 5.9987E−02 | −1.2963E+00 | −1.2000E−01 | −2.7990E−03 | 1.1451E−02 |
| A16 = | −1.5065E−02 | −4.5222E−03 | 2.8808E−01 | 3.7316E−02 | 5.5421E−04 | −1.9103E−03 |
| A18 = | — | — | — | −6.3139E−03 | −4.0836E−05 | 2.4098E−04 |
| A20 = | — | — | — | 4.5579E−04 | — | −1.5284E−05 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.77 | |f4/f5| | 0.34 |
| Fno | 2.00 | (|f/f1| + |f/f3| + |f/f5|)/(|f/f2| + |f/f4| + |f/f6|) | 0.22 |
| HFOV [deg.] | 54.7 | f/EPD | 2.00 |
| V3/N3 | 14.34 | tan(HFOV) | 1.41 |
| V6/N6 | 19.09 | Dsr3/Dsr4 | 0.06 |
| CT1/T12 | 0.66 | SD/TD | 0.81 |
| CT4/CT2 | 1.34 | TL/f | 2.26 |
| T45/T34 | 0.20 | TL/ImgH | 1.81 |
| (T45 + T56)/CT4 | 0.23 | TL$^2$/(ImgH × EPD) | 8.21 |
| (T23 + T45)/(CT2 + CT4) | 0.125 | |f/R1| + |f/R2| | 0.25 |
| f/R10 | 1.790 | |f/R3| + |f/R4| | 1.00 |
| (R3 + R4)/(R3 − R4) | 0.952 | |f/R5| + |f/R6| | 2.22 |
| (R11 + R12)/(R11 − R12) | 1.117 | |f/R7| + |f/R8| | 3.03 |
| |R4/R2| + |R8/R7| | 0.208 | |f/R9| + |f/R10| | 2.84 |
| |f2/f1| | 0.07 | |f/R11| + |f/R12| | 1.77 |
| |f2/f5| | 0.78 | — | — |

7th Embodiment

Figure 13:
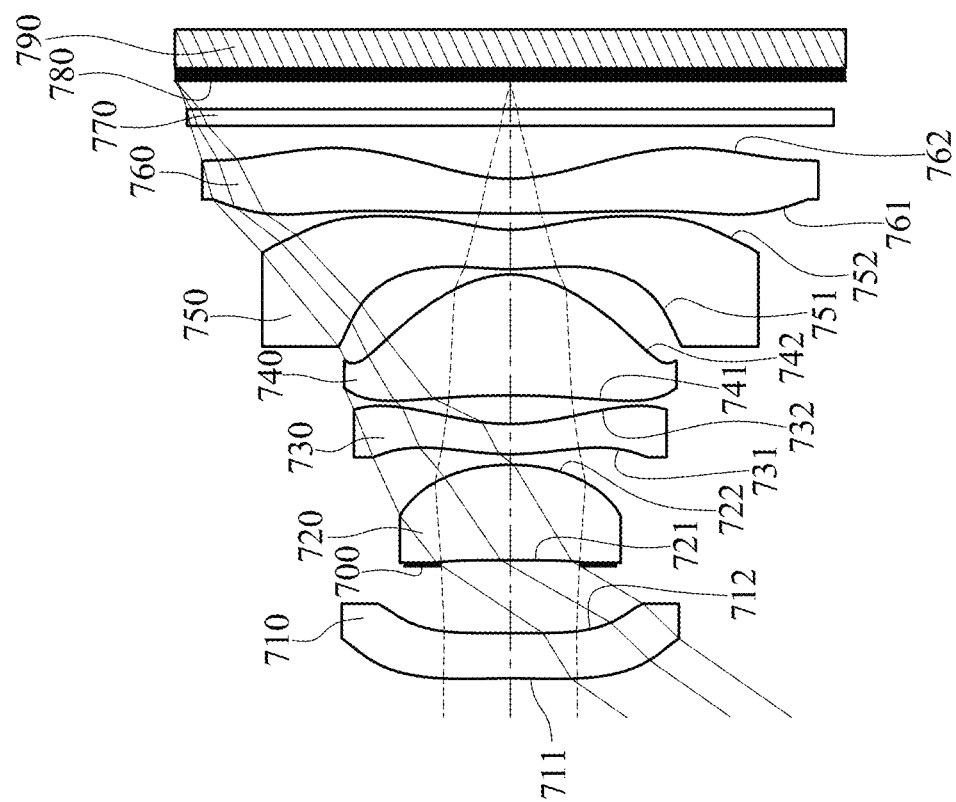
FIG. 13 is a schematic view of an image capturing unit according to the 7th embodiment of the present disclosure.
Figure 14:
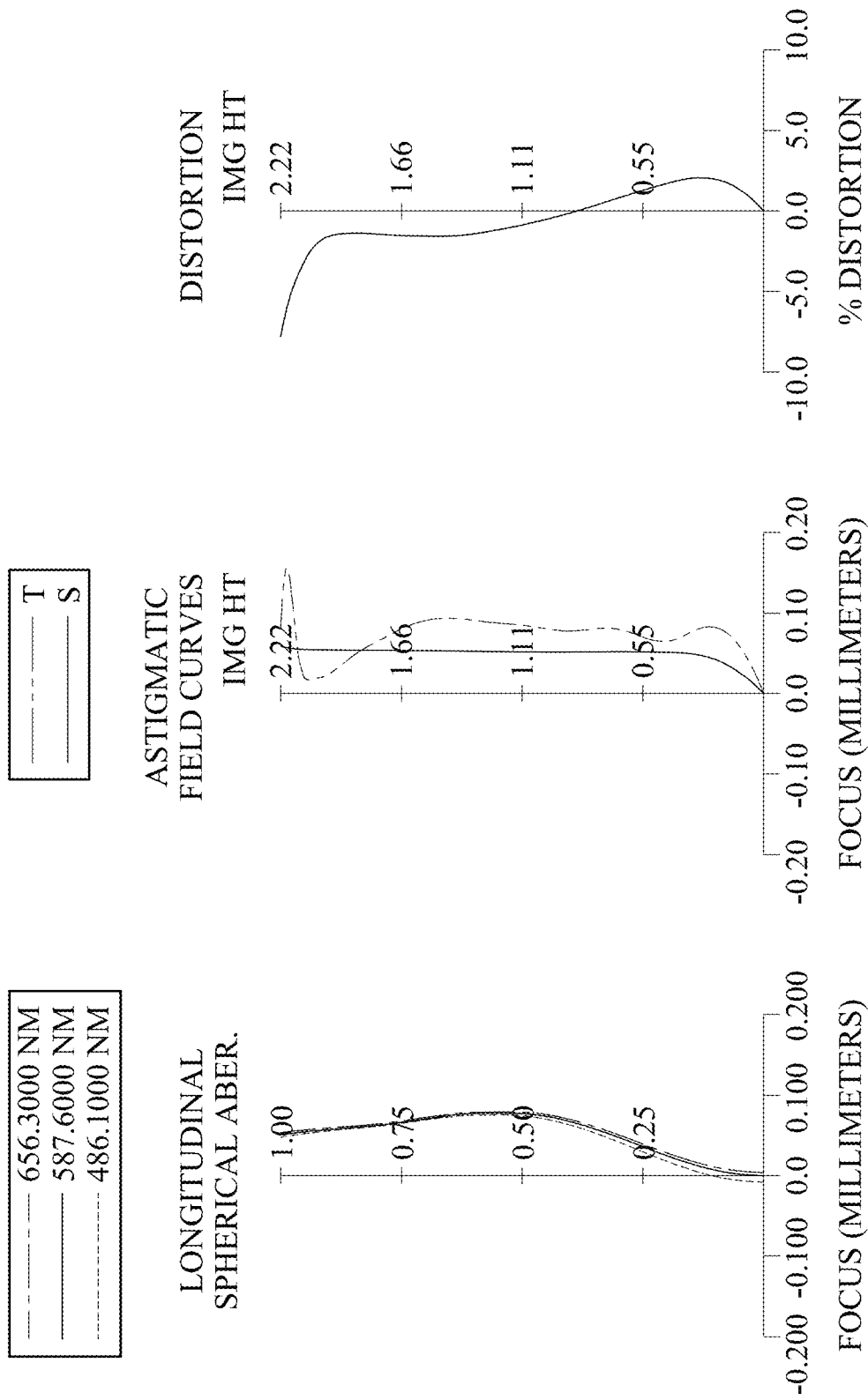
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the photographing lens assembly (its reference numeral is omitted) of the present disclosure and an image sensor 790. The photographing lens assembly includes, in order from an object side to an image side, a first lens element 710, an aperture stop 700, a second lens element 720, a third lens element 730, a fourth lens element 740, a fifth lens element 750, a sixth lens element 760, a filter 770 and an image surface 780. The photographing lens assembly includes six lens elements (710, 720, 730, 740, 750 and 760) with no additional lens element disposed between each of the adjacent six lens elements.

The first lens element 710 with negative refractive power has an object-side surface 711 being concave in a paraxial region thereof and an image-side surface 712 being convex in a paraxial region thereof. The first lens element 710 is made of plastic material and has the object-side surface 711 and the image-side surface 712 being both aspheric.

The second lens element 720 with positive refractive power has an object-side surface 721 being convex in a paraxial region thereof and an image-side surface 722 being convex in a paraxial region thereof. The second lens element 720 is made of plastic material and has the object-side surface 721 and the image-side surface 722 being both aspheric.

The third lens element 730 with negative refractive power has an object-side surface 731 being convex in a paraxial region thereof and an image-side surface 732 being concave in a paraxial region thereof. The third lens element 730 is made of plastic material and has the object-side surface 731 and the image-side surface 732 being both aspheric.

The fourth lens element 740 with positive refractive power has an object-side surface 741 being concave in a paraxial region thereof and an image-side surface 742 being convex in a paraxial region thereof. The fourth lens element 740 is made of plastic material and has the object-side surface 741 and the image-side surface 742 being both aspheric.

The fifth lens element 750 with negative refractive power has an object-side surface 751 being convex in a paraxial region thereof and an image-side surface 752 being concave in a paraxial region thereof. The fifth lens element 750 is made of plastic material and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of plastic material and has the object-side surface 761 and the image-side surface 762 being both aspheric. The image-side surface 762 of the sixth lens element 760 has at least one inflection point.

The filter 770 is made of glass material and located between the sixth lens element 760 and the image surface 780, and will not affect the focal length of the photographing lens assembly. The image sensor 790 is disposed on or near the image surface 780 of the photographing lens assembly.

The detailed optical data of the 7th embodiment are shown in Table 13 and the aspheric surface data are shown in Table 14 below.

TABLE 13

7th Embodiment
f = 1.66 mm, Fno = 1.88, HFOV = 55.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −8.916 | (ASP) | 0.300 | Plastic | 1.584 | 28.2 | −28.02 |
| 2 | | −19.821 | (ASP) | 0.446 | | | | |
| 3 | Ape. Stop | Plano | | 0.035 | | | | |
| 4 | Lens 2 | 679.504 | (ASP) | 0.632 | Plastic | 1.545 | 56.1 | 2.50 |
| 5 | | −1.367 | (ASP) | 0.070 | | | | |
| 6 | Lens 3 | 1.620 | (ASP) | 0.200 | Plastic | 1.650 | 21.5 | −15.62 |
| 7 | | 1.329 | (ASP) | 0.189 | | | | |
| 8 | Lens 4 | −5.660 | (ASP) | 0.800 | Plastic | 1.545 | 56.1 | 1.28 |
| 9 | | −0.652 | (ASP) | 0.035 | | | | |
| 10 | Lens 5 | 1.723 | (ASP) | 0.261 | Plastic | 1.650 | 21.5 | −3.20 |
| 11 | | 0.887 | (ASP) | 0.108 | | | | |
| 12 | Lens 6 | 11.947 | (ASP) | 0.230 | Plastic | 1.582 | 30.2 | −2.20 |

TABLE 13-continued

7th Embodiment
f = 1.66 mm, Fno = 1.88, HFOV = 55.0 deg.

| Surface # | | Curvature Radius | | Thickness | Material | Index | Abbe # | Focal Length |
|---|---|---|---|---|---|---|---|---|
| 13 | | 1.151 | (ASP) | 0.350 | | | | |
| 14 | Filter | Plano | | 0.110 | Glass | 1.517 | 64.2 | — |
| 15 | | Plano | | 0.187 | | | | |
| 16 | Image | Plano | | — | | | | |

Note:
Reference wavelength is 587.6 nm (d-line).

TABLE 14

Aspheric Coefficients

| Surface # | | | | | |
|---|---|---|---|---|---|
| 1 | 2 | 4 | 5 | 6 | 7 |
| k = −2.0058E+01 | 7.4740E+00 | −2.0058E+01 | 1.9147E+00 | −2.0058E+01 | −3.1750E+00 |
| A4 = 3.2606E−01 | 5.5726E−01 | −1.5567E−01 | −4.7925E−01 | −3.6951E−01 | −4.1202E−01 |
| A6 = −3.2463E−01 | −1.3272E+00 | −2.4093E−01 | 1.4388E+00 | 7.3213E−01 | 8.1688E−01 |
| A8 = 5.9803E−01 | 6.9856E+00 | −8.0711E−01 | −2.3650E+00 | −1.9260E+00 | −1.5752E+00 |
| A10 = −8.0081E−01 | −2.3606E+01 | −2.0635E+00 | 1.5267E+00 | 3.0299E+00 | 1.8758E+00 |
| A12 = 6.4513E−01 | 4.6031E+01 | −8.6042E−11 | −8.0398E−01 | −2.8917E+00 | −1.2366E+00 |
| A14 = −2.1395E−01 | −4.5484E+01 | — | 3.1247E−04 | 1.2539E+00 | 3.3314E−01 |
| A16 = — | 1.7232E+01 | — | — | −2.2593E−12 | 1.7405E−05 |

| Surface # | | | | | |
|---|---|---|---|---|---|
| 8 | 9 | 10 | 11 | 12 | 13 |
| k = 1.3889E+01 | −1.5051E+00 | −9.0475E+01 | −1.2206E+01 | 3.2551E+01 | −8.2351E−01 |
| A4 = 2.0925E−02 | 1.0808E−01 | −6.0896E−01 | −5.0287E−01 | −1.7109E−02 | −4.8113E−01 |
| A6 = 8.7641E−02 | −1.2467E−01 | −1.5447E+00 | 9.7446E−01 | −5.9119E−02 | 4.3247E−01 |
| A8 = −1.3096E−01 | −1.6560E−01 | 1.1607E+00 | −1.3649E+00 | 1.1347E−01 | −3.2496E−01 |
| A10 = 2.4653E−01 | 2.8802E−01 | −3.3872E+01 | 1.3608E+00 | −1.0983E−01 | 1.5187E−01 |
| A12 = −2.0353E−01 | −1.3044E−01 | 5.1554E+01 | −9.1651E−01 | 5.8518E−02 | −3.9145E−02 |
| A14 = 9.4734E−02 | 6.7633E−02 | −4.0367E+01 | 3.8721E−01 | −1.7058E−02 | 4.1733E−03 |
| A16 = −1.8524E−02 | −2.2499E−03 | 1.2626E+01 | −9.5052E−02 | 2.5649E−03 | 2.7571E−04 |
| A18 = — | — | — | 1.1952E−02 | −1.5640E−04 | −1.0433E−04 |
| A20 = — | — | — | −5.5654E−04 | — | 6.6710E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.66 | \|f4/f5\| | 0.40 |
| Fno | 1.88 | (\|f/f1\| + \|f/f3\| + \|f/f5\|)/ | 0.25 |
| | | (\|f/f2\| + \|f/f4\| + \|f/f6\|) | |
| HFOV [deg.] | 55.0 | f/EPD | 1.88 |
| V3/N3 | 13.03 | tan(HFOV) | 1.43 |
| V6/N6 | 19.09 | Dsr3/Dsr4 | 0.05 |
| CT1/T12 | 0.62 | SD/TD | 0.77 |
| CT4/CT2 | 1.27 | TL/f | 2.38 |
| T45/T34 | 0.19 | TL/ImgH | 1.78 |
| (T45 + T56)/CT4 | 0.18 | TL$^2$/(ImgH × EPD) | 7.98 |
| (T23 + T45)/(CT2 + CT4) | 0.073 | \|f/R1\| + \|f/R2\| | 0.27 |
| f/R10 | 1.874 | \|f/R3\| + \|f/R4\| | 1.22 |

-continued

| 7th Embodiment | | | |
|---|---|---|---|
| (R3 + R4)/(R3 − R4) | 0.996 | \|f/R5\| + \|f/R6\| | 2.28 |
| (R11 + R12)/(R11 − R12) | 1.213 | \|f/R7\| + \|f/R8\| | 2.84 |
| \|R4/R3\| + \|R8/R7\| | 0.117 | \|f/R9\| + \|f/R10\| | 2.84 |
| \|f2/f1\| | 0.09 | \|f/R11\| + \|f/R12\| | 1.58 |
| \|f2/f5\| | 0.78 | | — |

8th Embodiment

Figure 15:
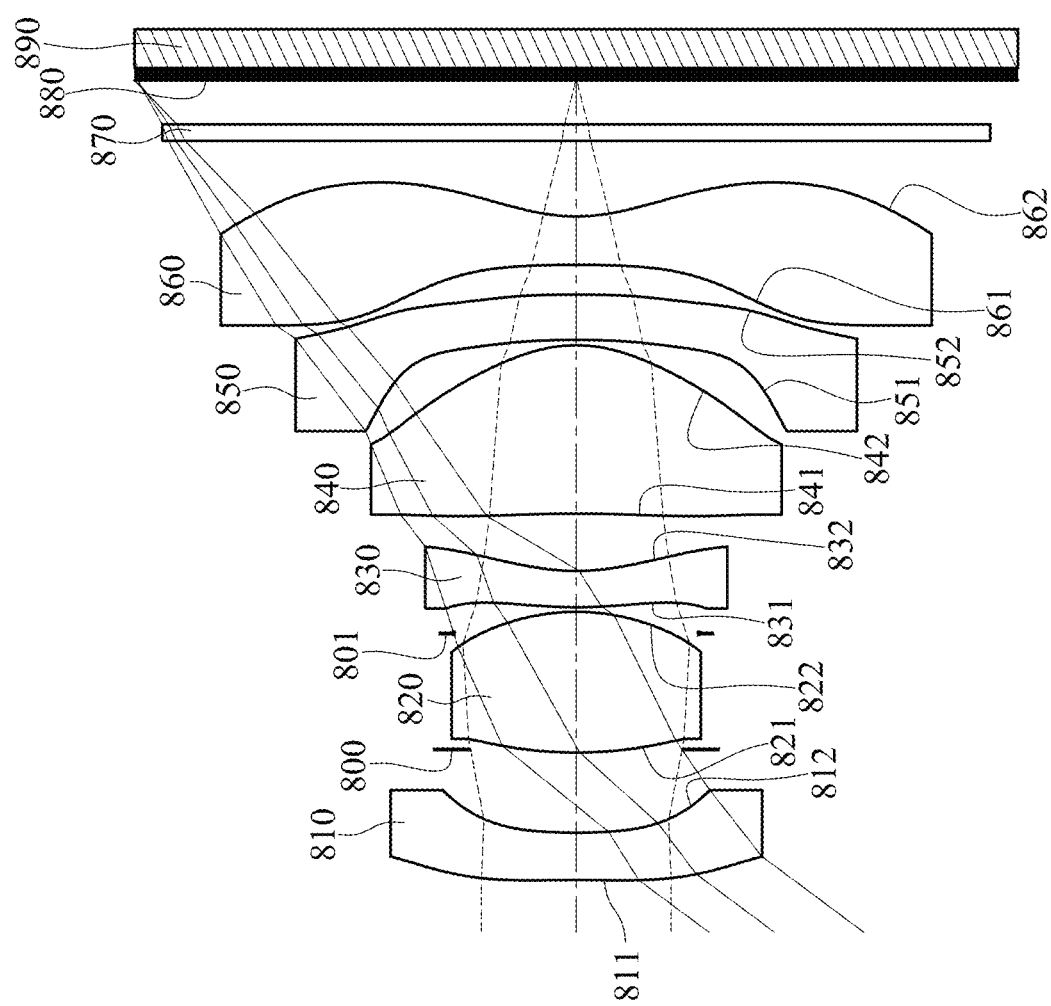
FIG. 15 is a schematic view of an image capturing unit according to the 8th embodiment of the present disclosure.
Figure 16:
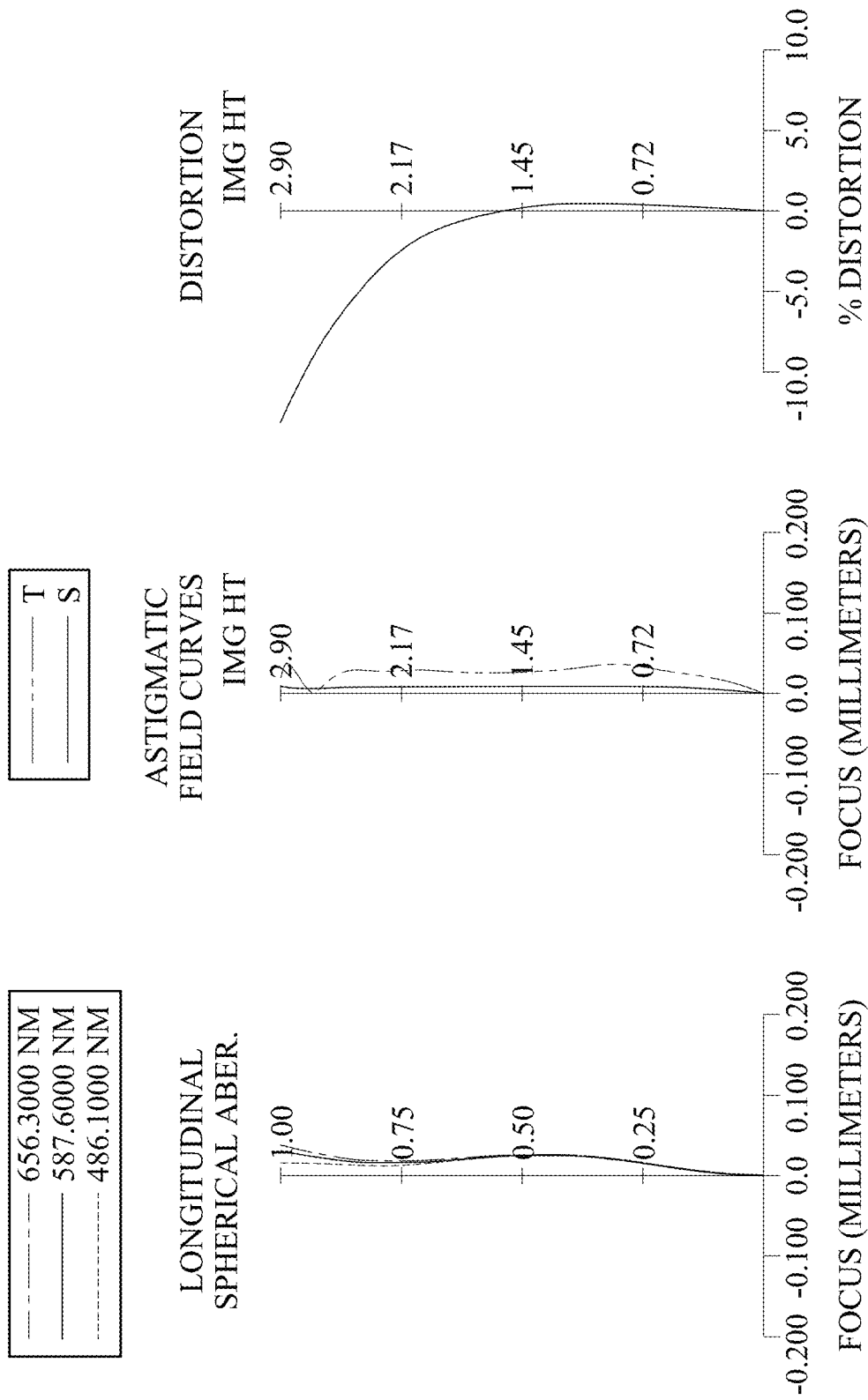
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the photographing lens assembly (its reference numeral is omitted) of the present disclosure and an image sensor 890. The photographing lens assembly includes, in order from an object side to an image side, a first lens element 810, an aperture stop 800, a second lens element 820, a stop 801, a third lens element 830, a fourth lens element 840, a fifth lens element 850, a sixth lens element 860, a filter 870 and an image surface 880. The photographing lens assembly includes six lens elements (810, 820, 830, 840, 850 and 860) with no additional lens element disposed between each of the adjacent six lens elements.

The first lens element 810 with negative refractive power has an object-side surface 811 being concave in a paraxial region thereof and an image-side surface 812 being concave in a paraxial region thereof. The first lens element 810 is made of plastic material and has the object-side surface 811 and the image-side surface 812 being both aspheric.

The second lens element 820 with positive refractive power has an object-side surface 821 being convex in a paraxial region thereof and an image-side surface 822 being convex in a paraxial region thereof. The second lens element 820 is made of plastic material and has the object-side surface 821 and the image-side surface 822 being both aspheric.

The third lens element 830 with negative refractive power has an object-side surface 831 being convex in a paraxial region thereof and an image-side surface 832 being concave in a paraxial region thereof. The third lens element 830 is made of plastic material and has the object-side surface 831 and the image-side surface 832 being both aspheric.

The fourth lens element 840 with positive refractive power has an object-side surface 841 being concave in a paraxial region thereof and an image-side surface 842 being convex in a paraxial region thereof. The fourth lens element 840 is made of plastic material and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric.

The sixth lens element 860 with negative refractive power has an object-side surface 861 being concave in a paraxial region thereof and an image-side surface 862 being concave in a paraxial region thereof. The sixth lens element 860 is made of plastic material and has the object-side surface 861 and the image-side surface 862 being both aspheric. The image-side surface 862 of the sixth lens element 860 has at least one inflection point.

The filter 870 is made of glass material and located between the sixth lens element 860 and the image surface 880, and will not affect the focal length of the photographing lens assembly. The image sensor 890 is disposed on or near the image surface 880 of the photographing lens assembly.

The detailed optical data of the 8th embodiment are shown in Table 15 and the aspheric surface data are shown in Table 16 below.

TABLE 15

8th Embodiment
f = 2.49 mm, Fno = 1.99, HFOV = 53.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −12.946 | (ASP) | 0.314 | Plastic | 1.545 | 56.1 | −5.92 |
| 2 | | 4.329 | (ASP) | 0.550 | | | | |
| 3 | Ape. Stop | Plano | | −0.020 | | | | |
| 4 | Lens 2 | 2.807 | (ASP) | 0.931 | Plastic | 1.544 | 56.0 | 1.85 |
| 5 | | −1.388 | (ASP) | −0.144 | | | | |
| 6 | Stop | Plano | | 0.174 | | | | |
| 7 | Lens 3 | 2.916 | (ASP) | 0.240 | Plastic | 1.640 | 22.0 | −4.70 |
| 8 | | 1.433 | (ASP) | 0.379 | | | | |
| 9 | Lens 4 | −8.733 | (ASP) | 1.114 | Plastic | 1.544 | 56.0 | 1.85 |
| 10 | | −0.941 | (ASP) | 0.035 | | | | |
| 11 | Lens 5 | −7.931 | (ASP) | 0.300 | Plastic | 1.600 | 28.5 | −38.18 |
| 12 | | −12.301 | (ASP) | 0.197 | | | | |
| 13 | Lens 6 | −8.962 | (ASP) | 0.320 | Plastic | 1.583 | 30.7 | −1.78 |
| 14 | | 1.188 | (ASP) | 0.500 | | | | |
| 15 | Filter | Plano | | 0.110 | Glass | 1.517 | 64.2 | — |
| 16 | | Plano | | 0.289 | | | | |
| 17 | Image | Plano | | — | | | | |

Note:
Reference wavelength is 587.6 nm (d-line).
An effective radius of the stop 801 (Surface 6) is 0.810 mm.

TABLE 16

Aspheric Coefficients

| | Surface # | | | | |
|---|---|---|---|---|---|
| 1 | 2 | 4 | 5 | 7 | 8 |
| k = 4.5247E+01 | −8.1143E+01 | −1.6961E−01 | −1.9779E+00 | −1.4985E+01 | −3.7930E+00 |
| A4 = 2.4365E−01 | 4.9090E−01 | 3.7838E−02 | 1.0485E−02 | −2.5981E−01 | −2.7949E−01 |
| A6 = −1.8365E−01 | −2.7233E−01 | 1.6128E−03 | −1.4103E−01 | 5.0569E−01 | 5.7874E−01 |
| A8 = 1.2406E−01 | 2.8426E−02 | −2.8862E−01 | 1.9106E−02 | −1.4304E+00 | −1.0336E+00 |
| A10 = −6.8694E−02 | 6.9988E−01 | 4.8850E−01 | −3.1539E−02 | 2.2781E+00 | 1.1503E+00 |

TABLE 16-continued

| Aspheric Coefficients | | | | | |
|---|---|---|---|---|---|
| A12 = | 1.8876E−02 | −1.1055E+00 | −5.5309E−01 | −1.9365E−02 | −2.2003E+00 | −7.4547E−01 |
| A14 = | −1.7128E−03 | 5.1025E−01 | — | — | 9.2249E−01 | 2.1604E−01 |

| | Surface # | | | | |
|---|---|---|---|---|---|
| | 9 | 10 | 11 | 12 | 13 | 14 |
| k = | 1.7479E+01 | −1.0746E+00 | 1.7230E+01 | −5.5504E+01 | 1.0538E+01 | −9.4665E−01 |
| A4 = | 5.5050E−02 | 1.5475E−01 | −3.3121E−01 | −3.2557E−01 | −9.0818E−02 | −3.6791E−01 |
| A6 = | 6.9873E−03 | 1.7524E−01 | 9.9727E−01 | 7.4354E−01 | −7.0219E−02 | 2.3046E−01 |
| A8 = | −2.5440E−02 | −6.0006E−01 | −1.3855E+00 | −7.6695E−01 | 9.4141E−02 | −1.2045E−01 |
| A10 = | 2.3845E−02 | 6.7284E−01 | 1.0219E+00 | 4.0953E−01 | −3.4269E−02 | 4.6331E−02 |
| A12 = | −1.3168E−02 | −4.0477E−01 | −4.4884E−01 | −1.1868E−01 | 5.2545E−03 | −1.2052E−02 |
| A14 = | 2.0812E−03 | 1.3227E−01 | 1.0153E−01 | 1.7808E−02 | −2.6688E−04 | 1.9505E−03 |
| A16 = | 1.0603E−04 | −1.8100E−02 | −7.5814E−03 | −1.0877E−03 | −5.2096E−06 | −1.7492E−04 |
| A18 = | — | — | — | — | — | 6.6024E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.49 | |f4/f5| | 0.05 |
| Fno | 1.99 | (|f/f1| + |f/f3| + |f/f5|)/ (|f/f2| + |f/f4| + |f/f6|) | 0.25 |
| HFOV [deg.] | 53.3 | f/EPD | 1.99 |
| V3/N3 | 13.41 | tan(HFOV) | 1.34 |
| V6/N6 | 19.39 | Dsr3/Dsr4 | 0.02 |
| CT1/T12 | 0.59 | SD/TD | 0.80 |
| CT4/CT2 | 1.20 | TL/f | 2.12 |
| T45/T34 | 0.09 | TL/ImgH | 1.82 |
| (T45 + T56)/CT4 | 0.21 | TL$^2$/(ImgH × EPD) | 7.70 |
| (T23 + T45)/(CT2 + CT4) | 0.032 | |f/R1| + |f/R2| | 0.77 |
| f/R10 | −0.203 | |f/R3| + |f/R4| | 2.68 |
| (R3 + R4)/(R3 − R4) | 0.338 | |f/R5| + |f/R6| | 2.59 |
| (R11 + R12)/(R11 − R12) | 0.766 | |f/R7| + |f/R8| | 2.94 |
| |R4/R2| + |R8/R7| | 0.602 | |f/R9| + |f/R10| | 0.52 |
| |f2/f1| | 0.31 | |f/R11| + |f/R12| | 2.38 |
| |f2/f5| | 0.05 | — | — |

9th Embodiment

Figure 17:
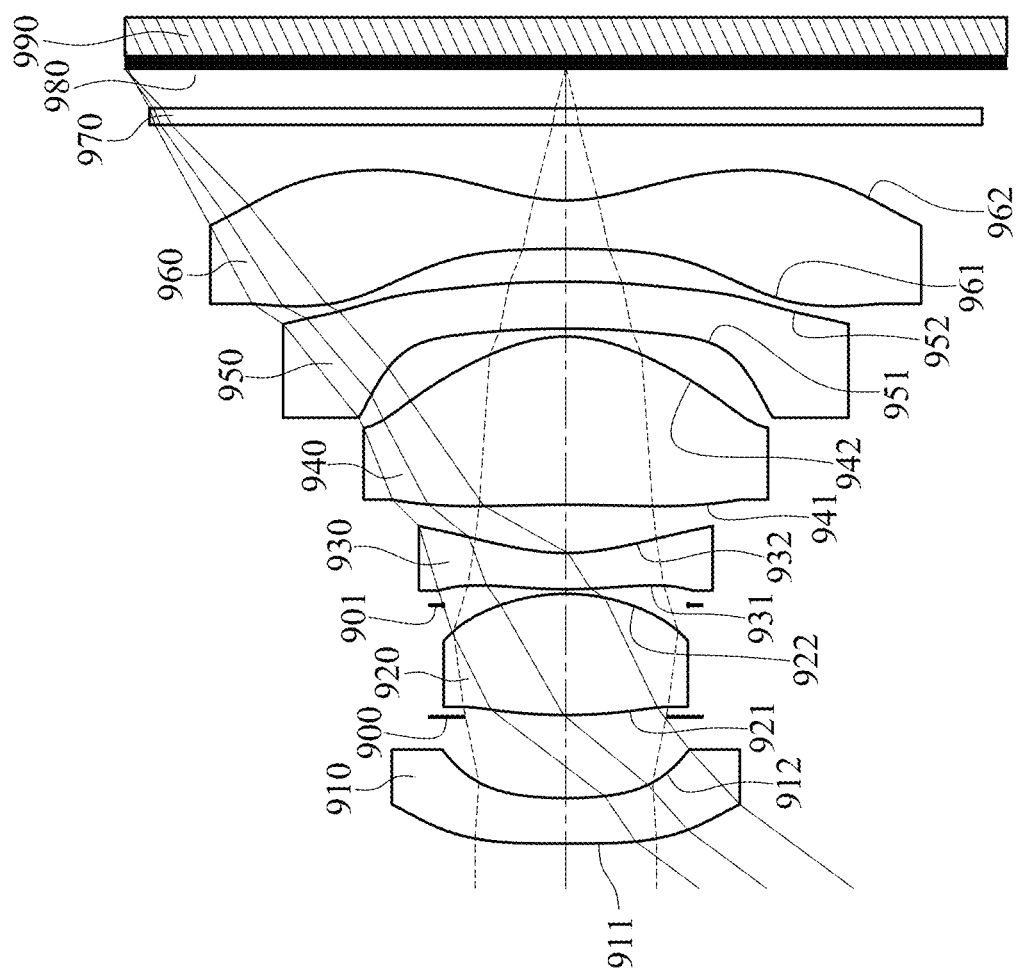
FIG. 17 is a schematic view of an image capturing unit according to the 9th embodiment of the present disclosure.
Figure 18:
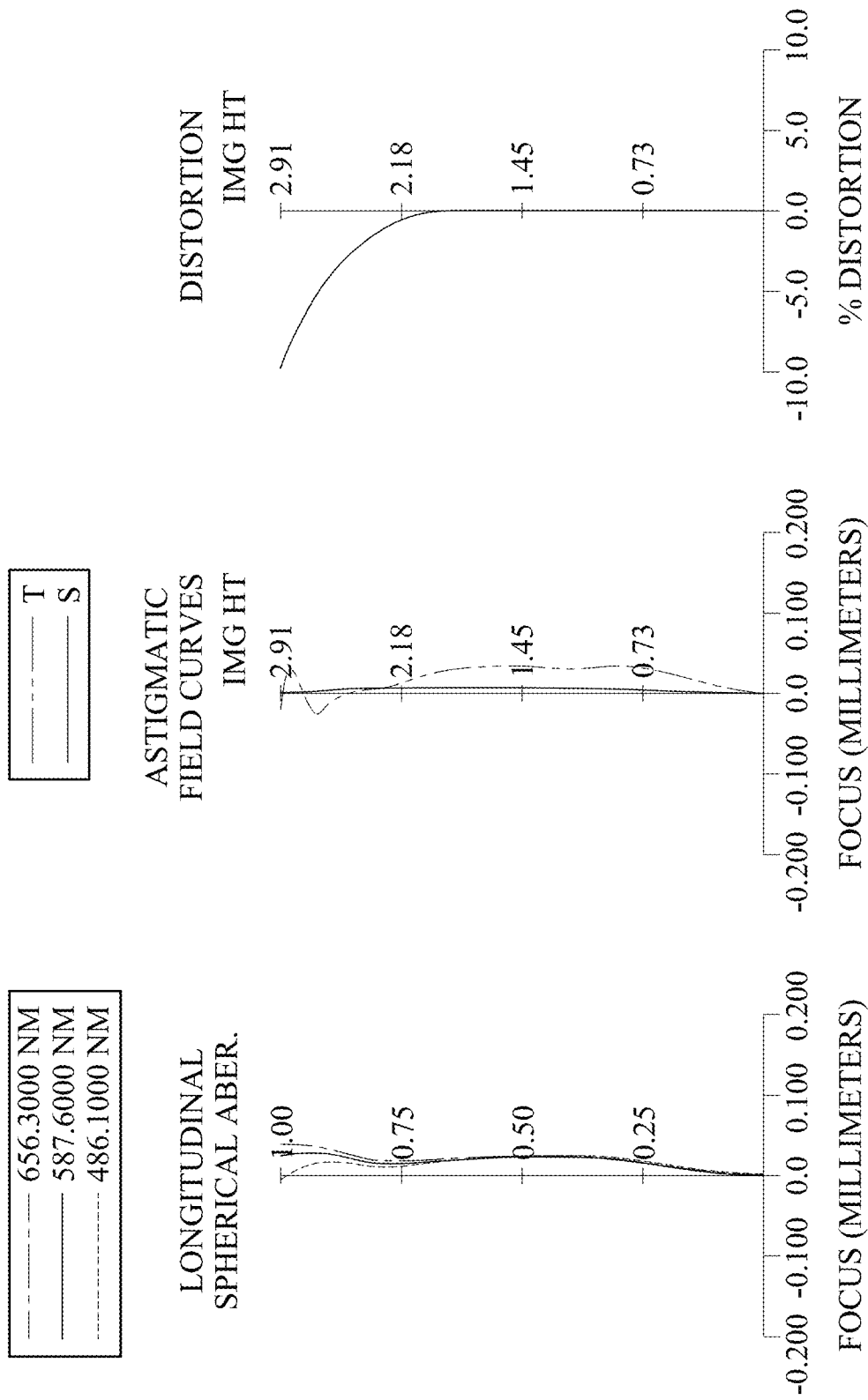
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the photographing lens assembly (its reference numeral is omitted) of the present disclosure and an image sensor 990. The photographing lens assembly includes, in order from an object side to an image side, a first lens element 910, an aperture stop 900, a second lens element 920, a stop 901, a third lens element 930, a fourth lens element 940, a fifth lens element 950, a sixth lens element 960, a filter 970 and an image surface 980. The photographing lens assembly includes six lens elements (910, 920, 930, 940, 950 and 960) with no additional lens element disposed between each of the adjacent six lens elements.

The first lens element 910 with negative refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with positive refractive power has an object-side surface 921 being convex in a paraxial region thereof and an image-side surface 922 being convex in a paraxial region thereof. The second lens element 920 is made of plastic material and has the object-side surface 921 and the image-side surface 922 being both aspheric.

The third lens element 930 with negative refractive power has an object-side surface 931 being convex in a paraxial region thereof and an image-side surface 932 being concave in a paraxial region thereof. The third lens element 930 is made of plastic material and has the object-side surface 931 and the image-side surface 932 being both aspheric.

The fourth lens element 940 with positive refractive power has an object-side surface 941 being concave in a paraxial region thereof and an image-side surface 942 being convex in a paraxial region thereof. The fourth lens element 940 is made of plastic material and has the object-side surface 941 and the image-side surface 942 being both aspheric.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric.

The sixth lens element 960 with negative refractive power has an object-side surface 961 being concave in a paraxial region thereof and an image-side surface 962 being concave in a paraxial region thereof. The sixth lens element 960 is made of plastic material and has the object-side surface 961 and the image-side surface 962 being both aspheric. The image-side surface 962 of the sixth lens element 960 has at least one inflection point.

The filter 970 is made of glass material and located between the sixth lens element 960 and the image surface 980, and will not affect the focal length of the photographing lens assembly. The image sensor 990 is disposed on or near the image surface 980 of the photographing lens assembly.

The detailed optical data of the 9th embodiment are shown in Table 17 and the aspheric surface data are shown in Table 18 below.

TABLE 17

9th embodiment
f = 2.39 mm, Fno = 1.99, HFOV = 53.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 64.666 | (ASP) | 0.301 | Plastic | 1.545 | 56.1 | −5.91 |
| 2 | | 3.064 | (ASP) | 0.537 | | | | |
| 3 | Ape. Stop | Plano | | 0.012 | | | | |
| 4 | Lens 2 | 3.411 | (ASP) | 0.802 | Plastic | 1.545 | 56.1 | 1.80 |
| 5 | | −1.261 | (ASP) | −0.075 | | | | |
| 6 | Stop | Plano | | 0.105 | | | | |
| 7 | Lens 3 | 2.978 | (ASP) | 0.240 | Plastic | 1.639 | 23.5 | −4.26 |
| 8 | | 1.377 | (ASP) | 0.319 | | | | |
| 9 | Lens 4 | −10.368 | (ASP) | 1.113 | Plastic | 1.544 | 56.0 | 1.82 |
| 10 | | −0.938 | (ASP) | 0.052 | | | | |
| 11 | Lens 5 | −7.829 | (ASP) | 0.310 | Plastic | 1.614 | 26.0 | −44.38 |
| 12 | | −11.153 | (ASP) | 0.218 | | | | |
| 13 | Lens 6 | −8.912 | (ASP) | 0.320 | Plastic | 1.584 | 28.2 | −1.80 |
| 14 | | 1.206 | (ASP) | 0.500 | | | | |
| 15 | Filter | Plano | | 0.110 | Glass | 1.517 | 64.2 | — |
| 16 | | Plano | | 0.262 | | | | |
| 17 | Image | Plano | | — | | | | |

Note:
Reference wavelength is 587.6 nm (d-line).
An effective radius of the stop 901 (Surface 6) is 0.810 mm.

TABLE 18

Aspheric Coefficients

| | Surface # | | | | | |
|---|---|---|---|---|---|---|
| | 1 | 2 | 4 | 5 | 7 | 8 |
| k = | 9.0000E+01 | 7.4556E+00 | −1.0297E+01 | −1.2859E+00 | −1.9031E+01 | −3.5384E+00 |
| A4 = | 2.8886E−01 | 4.2100E−01 | 4.4363E−02 | −3.1499E−02 | −3.4443E−01 | −3.4111E−01 |
| A6 = | −2.0271E−01 | 4.1277E−02 | 2.7531E−02 | 1.1419E−01 | 9.7619E−01 | 8.5034E−01 |
| A8 = | 1.5065E−01 | −8.2210E−01 | −7.7320E−01 | −9.5045E−01 | −2.8799E+00 | −1.6601E+00 |
| A10 = | −6.4392E−02 | 2.8657E+00 | 1.6839E+00 | 1.3376E+00 | 4.7746E+00 | 2.0387E+00 |
| A12 = | −3.8128E−03 | −3.4210E+00 | −2.1694E+00 | −8.4112E−01 | −4.5421E+00 | −1.4251E+00 |
| A14 = | 4.5340E−03 | 1.2647E+00 | — | — | 1.9149E+00 | 4.3846E−01 |

| | Surface # | | | | | |
|---|---|---|---|---|---|---|
| | 9 | 10 | 11 | 12 | 13 | 14 |
| k = | −7.8105E+01 | −1.1036E+00 | 2.2358E+01 | 1.9084E+01 | 1.3423E+01 | −9.4602E−01 |
| A4 = | 5.3126E−02 | 2.1193E−01 | −1.8411E−01 | −2.4812E−01 | −1.1296E−01 | −3.9655E−01 |
| A6 = | 5.1110E−02 | 9.4021E−04 | 6.4374E−01 | 6.4062E−01 | −5.1086E−02 | 2.6782E−01 |
| A8 = | −1.6683E−01 | −3.8264E−01 | −9.4437E−01 | −7.4702E−01 | 9.8075E−02 | −1.4928E−01 |
| A10 = | 2.3338E−01 | 5.4290E−01 | 6.3757E−01 | 4.6234E−01 | −4.2139E−02 | 6.1612E−02 |
| A12 = | −1.6816E−01 | −3.8819E−01 | −2.1859E−01 | −1.6375E−01 | 7.8976E−03 | −1.7686E−02 |
| A14 = | 5.6597E−02 | 1.5138E−01 | 1.6574E−02 | 3.3522E−02 | −5.2681E−04 | 3.3350E−03 |
| A16 = | −6.2668E−03 | −2.4416E−02 | 6.6446E−03 | −3.7076E−03 | −2.5077E−05 | −3.8843E−04 |
| A18 = | — | — | — | 1.7224E−04 | 3.7024E−06 | 2.5243E−05 |
| A20 = | — | — | — | — | — | −7.0196E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.39 | |f4/f5| | 0.04 |
| Fno | 1.99 | (|f/f1| + |f/f3| + |f/f5|)/ (|f/f2| + |f/f4| + |f/f6|) | 0.26 |
| HFOV [deg.] | 53.5 | f/EPD | 1.99 |
| V3/N3 | 14.34 | tan(HFOV) | 1.35 |
| V6/N6 | 17.80 | Dsr3/Dsr4 | 0.01 |
| CT1/T12 | 0.55 | SD/TD | 0.80 |
| CT4/CT2 | 1.39 | TL/f | 2.15 |
| T45/T34 | 0.16 | TL/ImgH | 1.76 |
| (T45 + T56)/CT4 | 0.24 | TL$^2$/(ImgH × EPD) | 7.53 |
| (T23 + T45)/(CT2 + CT4) | 0.043 | |f/R1| + |f/R2| | 0.82 |
| f/R10 | −0.214 | |f/R3| + |f/R4| | 2.59 |
| (R3 + R4)/(R3 − R4) | 0.460 | |f/R5| + |f/R6| | 2.53 |
| (R11 + R12)/(R11 − R12) | 0.762 | |f/R7| + |f/R8| | 2.77 |
| |R4/R2| + |R8/R7| | 0.460 | |f/R9| + |f/R10| | 0.52 |
| |f2/f1| | 0.30 | |f/R11| + |f/R12| | 2.25 |
| |f2/f5| | 0.04 | — | — |

10th Embodiment

Figure 19:
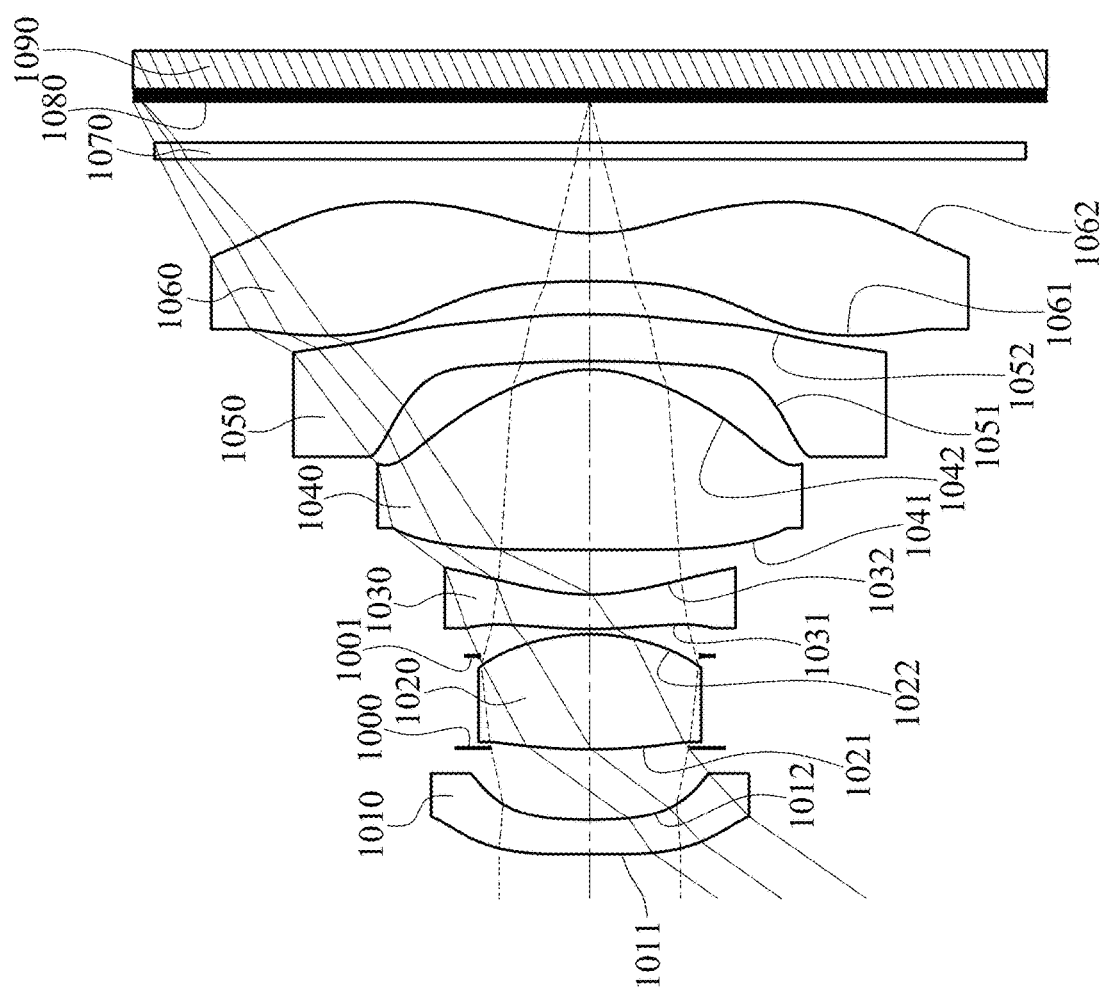
FIG. 19 is a schematic view of an image capturing unit according to the 10th embodiment of the present disclosure.
Figure 20:
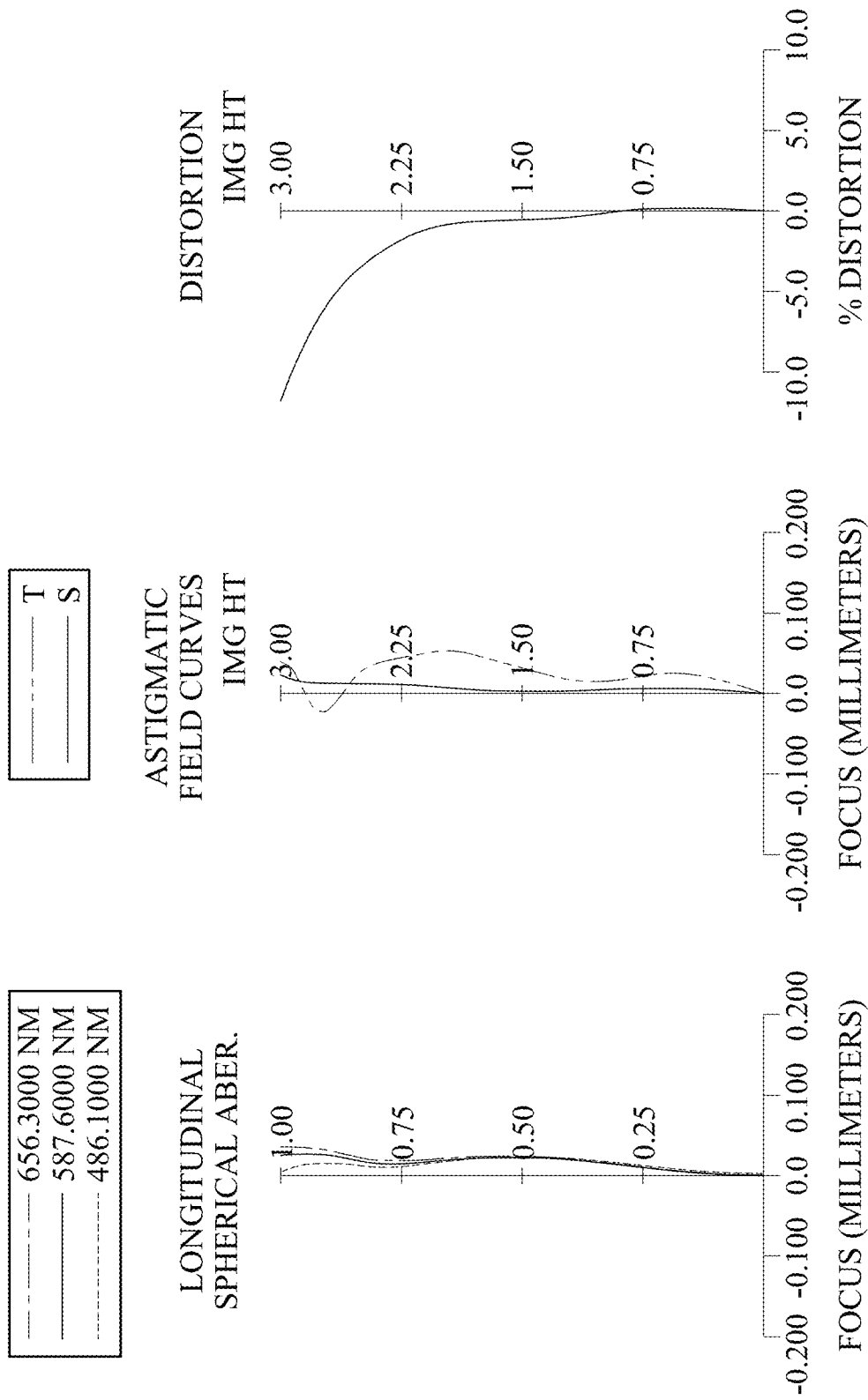
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the photographing lens assembly (its reference numeral is omitted) of the present disclosure and an image sensor 1090. The photographing lens assembly includes, in order from an object side to an image side, a first lens element 1010, an aperture stop 1000, a second lens element 1020, a stop 1001, a third lens element 1030, a fourth lens element 1040, a fifth lens element 1050, a sixth lens element 1060, a filter 1070 and an image surface 1080. The photographing lens assembly includes six lens elements (1010, 1020, 1030, 1040, 1050 and 1060) with no additional lens element disposed between each of the adjacent six lens elements.

The first lens element 1010 with negative refractive power has an object-side surface 1011 being concave in a paraxial region thereof and an image-side surface 1012 being concave in a paraxial region thereof. The first lens element 1010 is made of plastic material and has the object-side surface 1011 and the image-side surface 1012 being both aspheric.

The second lens element 1020 with positive refractive power has an object-side surface 1021 being convex in a paraxial region thereof and an image-side surface 1022 being convex in a paraxial region thereof. The second lens element 1020 is made of plastic material and has the object-side surface 1021 and the image-side surface 1022 being both aspheric.

The third lens element 1030 with negative refractive power has an object-side surface 1031 being convex in a paraxial region thereof and an image-side surface 1032 being concave in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric.

The fifth lens element 1050 with positive refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric.

The sixth lens element 1060 with negative refractive power has an object-side surface 1061 being concave in a paraxial region thereof and an image-side surface 1062 being concave in a paraxial region thereof. The sixth lens element 1060 is made of plastic material and has the object-side surface 1061 and the image-side surface 1062 being both aspheric. The image-side surface 1062 of the sixth lens element 1060 has at least one inflection point.

The filter 1070 is made of glass material and located between the sixth lens element 1060 and the image surface 1080, and will not affect the focal length of the photographing lens assembly. The image sensor 1090 is disposed on or near the image surface 1080 of the photographing lens assembly.

The detailed optical data of the 10th embodiment are shown in Table 19 and the aspheric surface data are shown in Table 20 below.

TABLE 19

10th embodiment
f = 2.38 mm, Fno = 1.97, HFOV = 55.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −25.458 | (ASP) | 0.231 | Plastic | 1.545 | 56.1 | −6.83 |
| 2 | | 4.372 | (ASP) | 0.482 | | | | |
| 3 | Ape. Stop | Plano | | −0.008 | | | | |
| 4 | Lens 2 | 4.324 | (ASP) | 0.768 | Plastic | 1.545 | 56.1 | 1.99 |
| 5 | | −1.359 | (ASP) | −0.145 | | | | |
| 6 | Stop | Plano | | 0.180 | | | | |
| 7 | Lens 3 | 3.015 | (ASP) | 0.230 | Plastic | 1.639 | 23.5 | −4.26 |
| 8 | | 1.388 | (ASP) | 0.298 | | | | |
| 9 | Lens 4 | 200.000 | (ASP) | 1.209 | Plastic | 1.545 | 56.1 | 1.82 |
| 10 | | −0.993 | (ASP) | 0.056 | | | | |

TABLE 19-continued

10th embodiment
f = 2.38 mm, Fno = 1.97, HFOV = 55.1 deg.

| Surface # | | Curvature Radius | | Thickness | Material | Index | Abbe # | Focal Length |
|---|---|---|---|---|---|---|---|---|
| 11 | Lens 5 | −12.280 | (ASP) | 0.312 | Plastic | 1.614 | 26.0 | 20.00 |
| 12 | | −6.198 | (ASP) | 0.221 | | | | |
| 13 | Lens 6 | −8.546 | (ASP) | 0.321 | Plastic | 1.614 | 26.0 | −1.61 |
| 14 | | 1.136 | (ASP) | 0.500 | | | | |
| 15 | Filter | Plano | | 0.110 | Glass | 1.517 | 64.2 | — |
| 16 | | Plano | | 0.274 | | | | |
| 17 | Image | Plano | | — | | | | |

Note:
Reference wavelength is 587.6 nm (d-line).
An effective radius of the stop 1001 (Surface 6) is 0.740 mm.

TABLE 20

Aspheric Coefficients

| | Surface # | | | | | |
|---|---|---|---|---|---|---|
| | 1 | 2 | 4 | 5 | 7 | 8 |
| k = | −8.0767E+01 | 2.2221E+01 | −5.9878E−01 | −1.5052E+00 | −2.3400E+01 | −3.5131E+00 |
| A4 = | 4.4665E−01 | 6.0613E−01 | 4.9519E−02 | 6.5987E−03 | −2.5310E−01 | −3.4381E−01 |
| A6 = | −3.7483E−01 | −6.1515E−02 | −7.1726E−02 | −1.2907E−03 | 6.9368E−01 | 8.7342E−01 |
| A8 = | 2.7278E−01 | −1.2298E+00 | 2.8553E−02 | −6.9989E−01 | −1.9841E+00 | −1.6353E+00 |
| A10 = | −2.8450E−03 | 4.5533E+00 | −4.3666E−01 | 9.2126E−01 | 3.0343E+00 | 1.8934E+00 |
| A12 = | −1.5756E−01 | −4.6228E+00 | — | −5.3423E−01 | −2.8573E+00 | −1.2536E+00 |
| A14 = | 5.6938E−02 | 5.4786E−01 | — | — | 1.2538E+00 | 3.6813E−01 |

| | Surface # | | | | | |
|---|---|---|---|---|---|---|
| | 9 | 10 | 11 | 12 | 13 | 14 |
| k = | −9.9000E+01 | −9.9318E−01 | −6.5400E+00 | −7.6713E+00 | 1.1451E+01 | −9.2969E−01 |
| A4 = | 4.3692E−02 | 1.9861E−01 | −1.8238E−01 | −2.0070E−01 | −1.5589E−01 | −4.5461E−01 |
| A6 = | 2.3466E−02 | −5.6109E−02 | 6.6382E−01 | 6.1453E−01 | −1.4426E−02 | 3.2973E−01 |
| A8 = | −1.3143E−01 | −1.8723E−01 | −1.0224E+00 | −7.4028E−01 | 1.1207E−01 | −1.8487E−01 |
| A10 = | 2.4808E−01 | 2.5389E−01 | 7.8261E−01 | 4.5604E−01 | −6.8080E−02 | 7.4607E−02 |
| A12 = | −2.2184E−01 | −1.5618E−01 | −3.6560E−01 | −1.5410E−01 | 1.9939E−02 | −2.1122E−02 |
| A14 = | 9.6377E−02 | 5.3328E−02 | 9.2453E−02 | 2.6965E−02 | −3.2327E−03 | 4.0325E−03 |
| A16 = | −1.6239E−02 | −7.5184E−03 | −8.6179E−03 | −1.5234E−03 | 2.7986E−04 | −4.8920E−04 |
| A18 = | — | — | — | −1.8447E−04 | −1.0141E−05 | 3.3881E−05 |
| A20 = | — | — | — | 2.2918E−05 | — | −1.0182E−06 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 2.38 | |f4/f5| | 0.09 |
| Fno | 1.97 | (|f/f1| + |f/f3| + |f/f5|)/ | 0.26 |
| | | (|f/f2| + |f/f4| + |f/f6|) | |
| HFOV [deg.] | 55.1 | f/EPD | 1.97 |
| V3/N3 | 14.34 | tan(HFOV) | 1.43 |
| V6/N6 | 16.11 | Dsr3/Dsr4 | 0.01 |
| CT1/T12 | 0.49 | SD/TD | 0.83 |
| CT4/CT2 | 1.57 | TL/f | 2.11 |
| T45/T34 | 0.19 | TL/ImgH | 1.68 |

-continued

| 10th Embodiment | | | |
|---|---|---|---|
| (T45 + T56)/CT4 | 0.23 | TL$^2$/(ImgH × EPD) | 7.00 |
| (T23 + T45)/(CT2 + CT4) | 0.046 | |f/R1| + |f/R2| | 0.64 |
| f/R10 | −0.385 | |f/R3| + |f/R4| | 2.31 |
| (R3 + R4)/(R3 − R4) | 0.522 | |f/R5| + |f/R6| | 2.51 |
| (R11 + R12)/(R11 − R12) | 0.765 | |f/R7| + |f/R8| | 2.41 |
| |R4/R2| + |R8/R7| | 0.319 | |f/R9| + |f/R10| | 0.58 |
| |f2/f1| | 0.29 | |f/R11| + |f/R12| | 2.38 |
| |f2/f5| | 0.10 | — | — |

11th Embodiment

Figure 21:
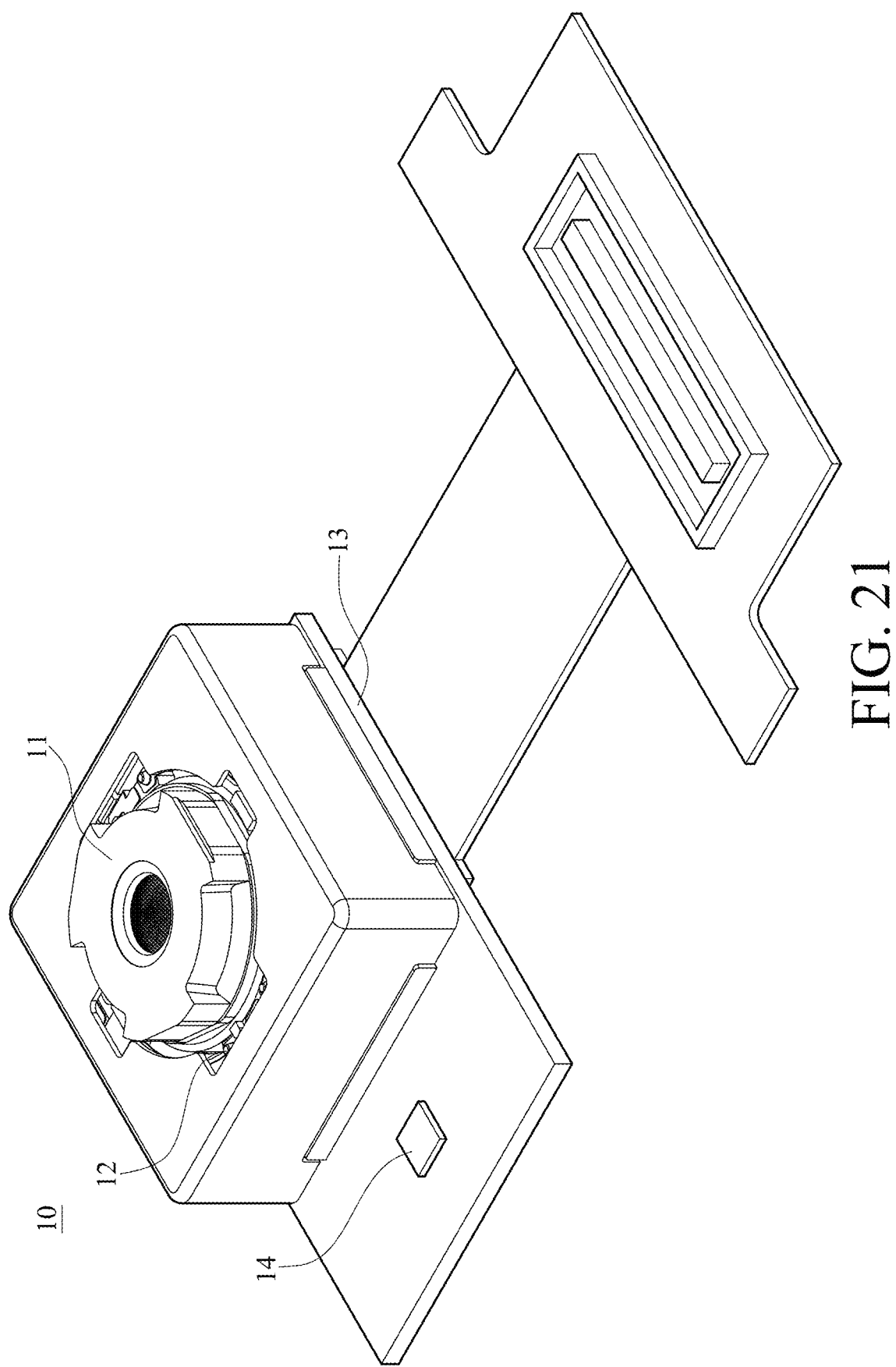
FIG. 21 is a perspective view of an image capturing unit according to the 11th embodiment of the present disclosure.

FIG. 21 is a perspective view of an image capturing unit according to the 11th embodiment of the present disclosure. In this embodiment, an image capturing unit 10 is a camera module including a lens unit 11, a driving device 12, an image sensor 13 and an image stabilizer 14. The lens unit 11 includes the photographing lens assembly disclosed in the 1st embodiment, a barrel and a holder member (their reference numerals are omitted) for holding the photographing lens assembly. The imaging light converges in the lens unit 11 of the image capturing unit 10 to generate an image with the driving device 12 utilized for image focusing on the image sensor 13, and the generated image is then digitally transmitted to other electronic component for further processing.

The driving device 12 can have auto focusing functionality, and different driving configurations can be obtained through the usages of voice coil motors (VCM), micro electro-mechanical systems (MEMS), piezoelectric systems, or shape memory alloy materials. The driving device 12 is favorable for obtaining a better imaging position of the lens unit 11, so that a clear image of the imaged object can be captured by the lens unit 11 with different object distances. The image sensor 13 (for example, CCD or CMOS), which can feature high photosensitivity and low noise, is disposed on the image surface of the photographing lens assembly to provide higher image quality.

The image stabilizer 14, such as an accelerometer, a gyro sensor and a Hall Effect sensor, is configured to work with the driving device 12 to provide optical image stabilization (OIS). The driving device 12 working with the image stabilizer 14 is favorable for compensating for pan and tilt of the lens unit 11 to reduce blurring associated with motion during exposure. In some cases, the compensation can be provided by electronic image stabilization (EIS) with image processing software, thereby improving image quality while in motion or low-light conditions.

12th Embodiment

Figure 22:
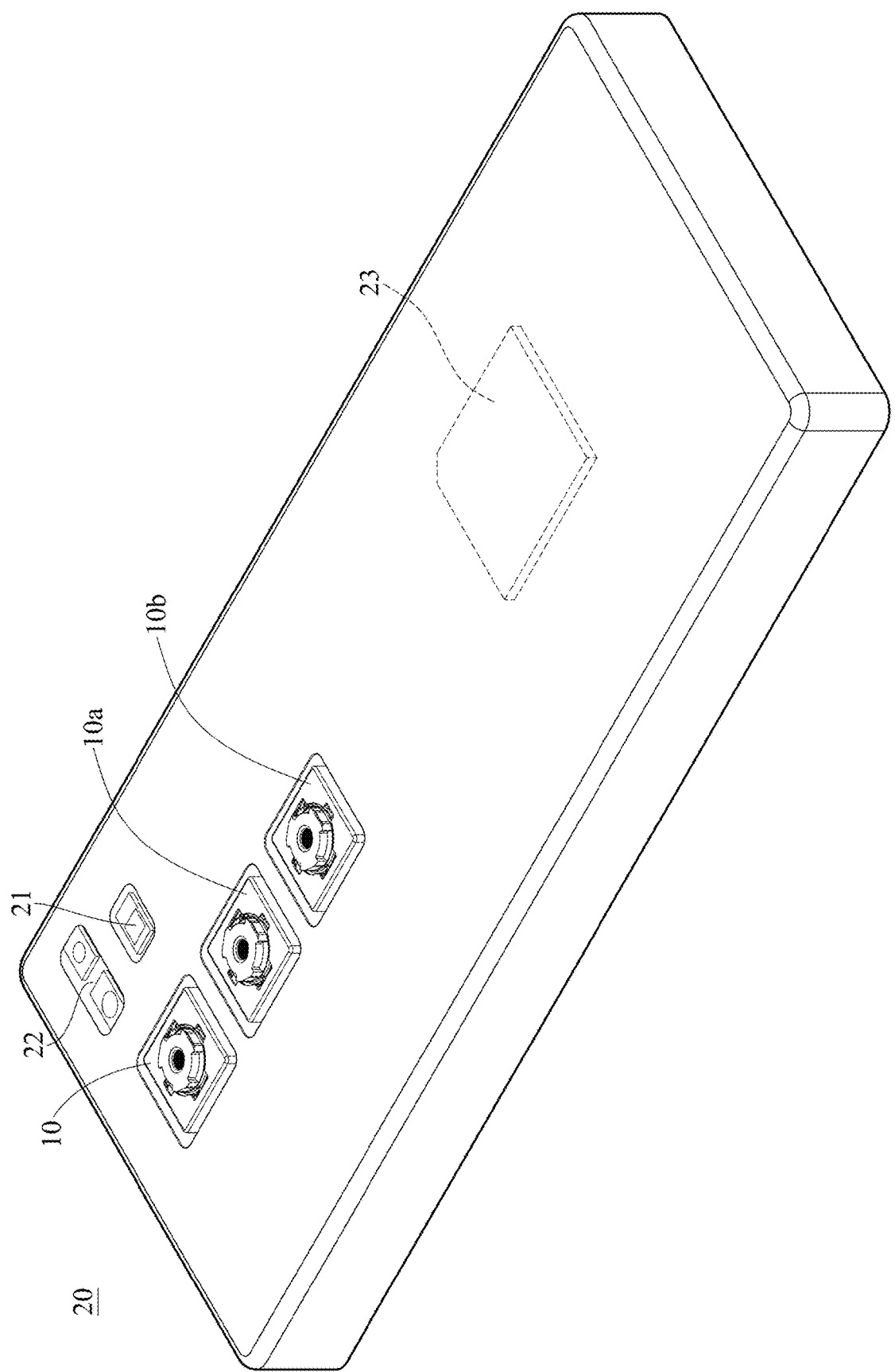
FIG. 22 is one perspective view of an electronic device according to the 12th embodiment of the present disclosure.
Figure 23:
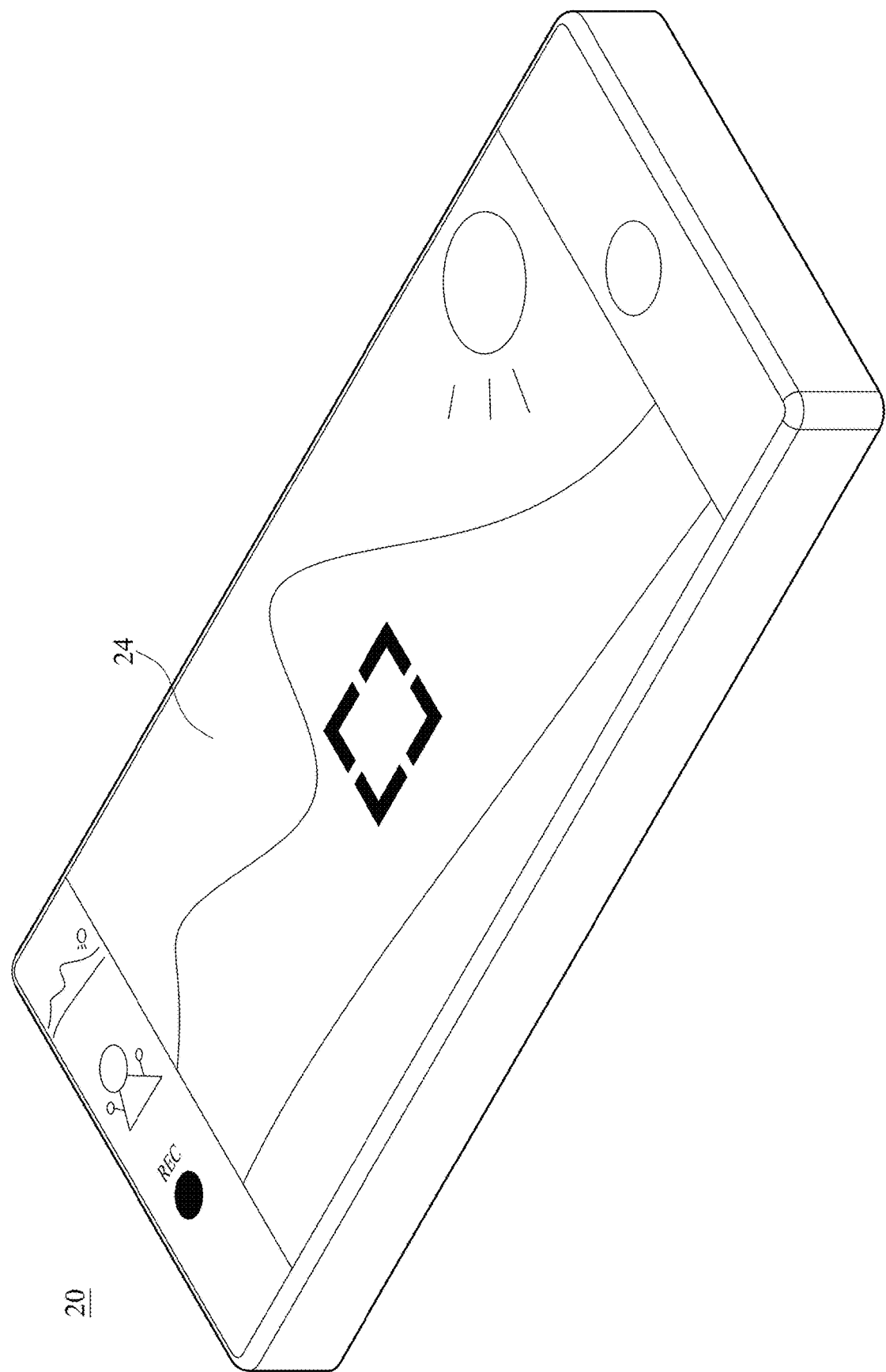
FIG. 23 is another perspective view of the electronic device in FIG. 22.
Figure 24:
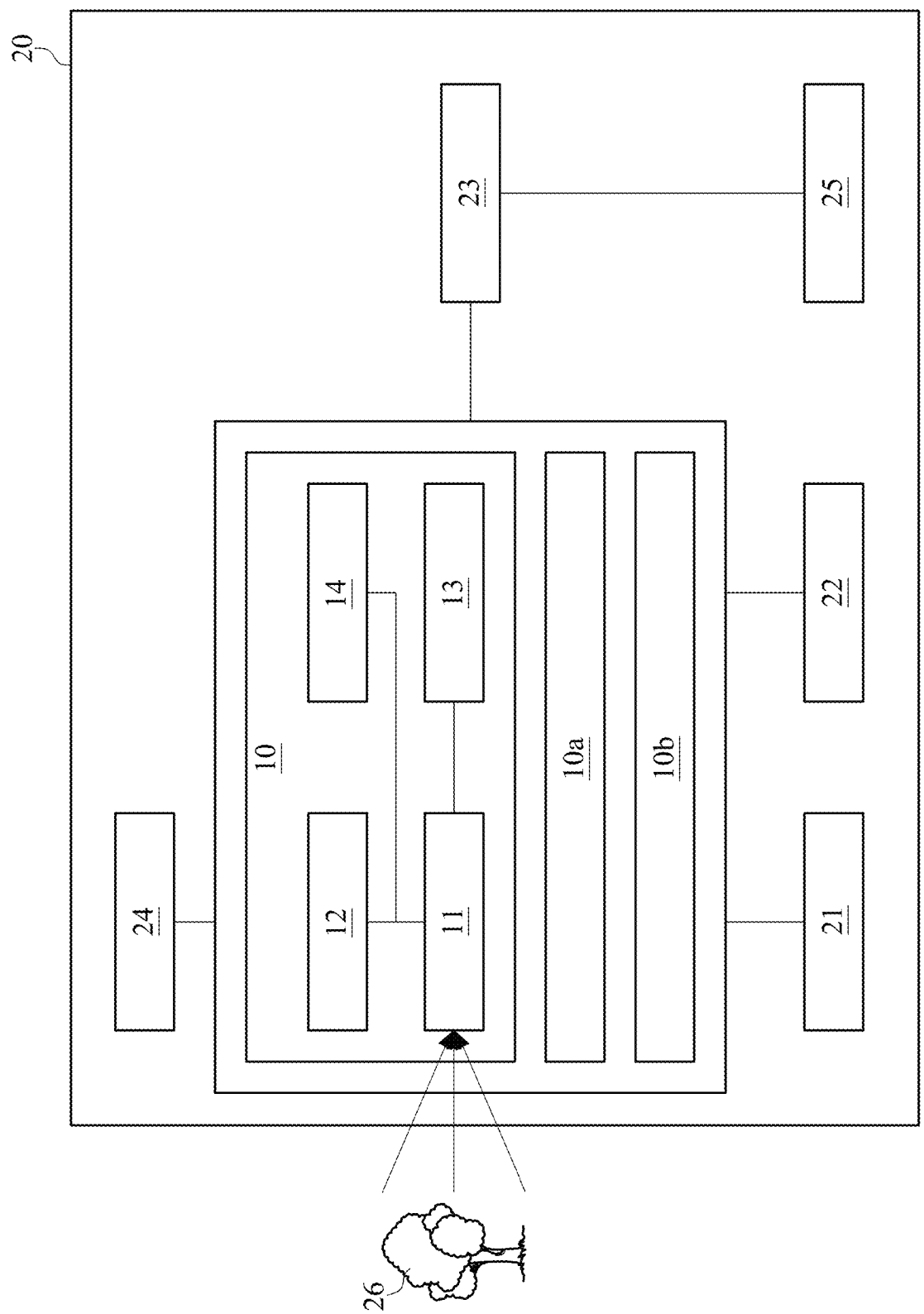
FIG. 24 is a block diagram of the electronic device in FIG. 22.

FIG. 22 is one perspective view of an electronic device according to the 12th embodiment of the present disclosure. FIG. 23 is another perspective view of the electronic device in FIG. 22. FIG. 24 is a block diagram of the electronic device in FIG. 22. In this embodiment, an electronic device 20 is a smartphone including the image capturing unit 10 disclosed in the 11th embodiment, an image capturing unit 10a, an image capturing unit 10b, a flash module 21, a focus assist module 22, an image signal processor 23, a user interface 24 and an image software processor 25. The image capturing unit 10, the image capturing unit 10a and the image capturing unit 10b all face the same direction and each has a single focal point. In this embodiment, the image capturing unit 10 is a wide-angle image capturing unit having a relatively large field of view, the image capturing unit 10b is a telephoto image capturing unit having a relatively small field of view, and the image capturing unit 10a has a field of view ranging between that of the image capturing unit 10 and the image capturing unit 10b; that is, the image capturing units 10, 10a, 10b have different fields of view to meet various photography requirements. In this embodiment, the electronic device 20 includes multiple image capturing units, but the present disclosure is not limited to the number of image capturing units.

When a user captures images of an object 26 through the user interface 24, the light rays converge in the image capturing unit 10, the image capturing unit 10a or the image capturing unit 10b to generate an image, and the flash module 21 is activated for light supplement. The focus assist module 22 detects the object distance of the imaged object 26 to achieve fast auto focusing. The image signal processor 23 is configured to optimize the captured image to improve image quality. The light beam emitted from the focus assist module 22 can be either conventional infrared or laser. The user interface 24 can be a touch screen or a physical button. The user is able to interact with the user interface 24 and the image software processor 25 having multiple functions to capture images and complete image processing.

The smartphone in this embodiment is only exemplary for showing the image capturing unit 10 of the present disclosure installed in an electronic device, and the present disclosure is not limited thereto. The image capturing unit 10 can be optionally applied to optical systems with a movable focus. Furthermore, the photographing lens assembly of the image capturing unit 10 features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing lens assembly comprising six lens elements, the six lens elements being, in order from an object side to an image side, a first lens element, a second lens element, a third lens element, a fourth lens element, a fifth lens element and a sixth lens element;
  wherein the second lens element has positive refractive power, the third lens element has an object-side surface being convex in a paraxial region thereof and an image-side surface being concave in a paraxial region thereof, the sixth lens element has an image-side surface being concave in a paraxial region thereof, and the image-side surface of the sixth lens element has at least one inflection point;
  wherein the photographing lens assembly further comprises an aperture stop, a focal length of the photographing lens assembly is f, a focal length of the first lens element is f1, a focal length of the second lens element is f2, a focal length of the third lens element is f3, a focal length of the fourth lens element is f4, a focal length of the fifth lens element is f5, a focal length of the sixth lens element is f6, an axial distance between the aperture stop and the image-side surface of the sixth lens element is SD, an axial distance between an object-side surface of the first lens element and the image-side surface of the sixth lens element is TD, a curvature radius of an image-side surface of the fifth lens element is R10, an axial distance between the object-side surface of the first lens element and an image surface is TL, a central thickness of the first lens element is CT1, an axial distance between the first lens element and the second lens element is T12, and the following conditions are satisfied:

$(|f/f1|+|f/f3|+|f/f5|)/(|f/f2|+|f/f4|+|f/f6|)<1.0;$ $0.72<SD/TD<1.0;$ $-0.90<f/R10<9.0;$ $1.75<TL/f<3.0;$ and $0.10<CT1/T12<3.3.$ 2. The photographing lens assembly of claim 1, wherein the sixth lens element has negative refractive power.

3. The photographing lens assembly of claim 1, wherein the first lens element has negative refractive power, the third lens element has negative refractive power, the focal length of the first lens element is f1, the focal length of the second lens element is f2, and the following condition is satisfied:

$|f2/f1|<0.60.$

4. The photographing lens assembly of claim 1, wherein the focal length of the photographing lens assembly is f, the focal length of the first lens element is f1, the focal length of the second lens element is f2, the focal length of the third lens element is f3, the focal length of the fourth lens element is f4, the focal length of the fifth lens element is f5, the focal length of the sixth lens element is f6, and the following condition is satisfied:

$(|f/f1|+|f/f3|+|f/f5|)/(|f/f2|+|f/f4|+|f/f6|)<0.55.$

5. The photographing lens assembly of claim 1, wherein the central thickness of the first lens element is CT1, the axial distance between the first lens element and the second lens element is T12, the focal length of the photographing lens assembly is f, the curvature radius of the image-side surface of the fifth lens element is R10, and the following conditions are satisfied:

$0.20<CT1/T12<1.0;$ and $-0.60<f/R10<3.0.$

6. The photographing lens assembly of claim 1, wherein a central thickness of the second lens element is CT2, a central thickness of the fourth lens element is CT4, and the following condition is satisfied:

$1.05<CT4/CT2<3.0.$

7. The photographing lens assembly of claim 1, wherein half of a maximum field of view of the photographing lens assembly is HFOV, the axial distance between the object-side surface of the first lens element and the image surface is TL, the focal length of the photographing lens assembly is f, and the following conditions are satisfied:

$1.20<\tan(HFOV)<2.50;$ and $1.90<TL/f<2.60.$

8. The photographing lens assembly of claim 1, wherein an axial distance between the second lens element and the third lens element is T23, an axial distance between the fourth lens element and the fifth lens element is T45, a central thickness of the second lens element is CT2, a central thickness of the fourth lens element is CT4, and the following condition is satisfied:

$0<(T23+T45)/(CT2+CT4)<0.20.$

9. The photographing lens assembly of claim 1, wherein an axial distance between the fourth lens element and the fifth lens element is T45, an axial distance between the fifth lens element and the sixth lens element is T56, a central thickness of the fourth lens element is CT4, and the following condition is satisfied:

$(T45+T56)/CT4<1.0.$

10. The photographing lens assembly of claim 1, wherein the axial distance between the object-side surface of the first lens element and the image surface is TL, a maximum image height of the photographing lens assembly is ImgH, the focal length of the photographing lens assembly is f, an entrance pupil diameter of the photographing lens assembly is EPD, and the following conditions are satisfied:

$1.0<TL/ImgH<2.0;$ and $1.20<f/EPD<2.10.$

11. The photographing lens assembly of claim 1, wherein an Abbe number of the third lens element is V3, a refractive index of the third lens element is N3, and the following condition is satisfied:

$10.0<V3/N3<15.0.$

12. The photographing lens assembly of claim 1, wherein the focal length of the fourth lens element is f4, the focal length of the fifth lens element is f5, the axial distance between the object-side surface of the first lens element and the image surface is TL, a maximum image height of the photographing lens assembly is ImgH, an entrance pupil diameter of the photographing lens assembly is EPD, and the following conditions are satisfied:

$|f4/f5|<1.0;$ and $4.0<TL^2/(ImgH \times EPD)<8.30.$

13. An image capturing unit, comprising:
the photographing lens assembly of claim 1; and
an image sensor disposed on the image surface of the photographing lens assembly.

14. An electronic device, comprising:
the image capturing unit of claim 13.

* * * * *